United States Patent
Gou et al.

(10) Patent No.: US 10,349,425 B2
(45) Date of Patent: Jul. 9, 2019

(54) RESOURCE OBTAINING METHOD, STATION AND COMPUTER STORAGE MEDIUM

(71) Applicant: ZTE CORPORATION, Shenzhen (CN)

(72) Inventors: Wei Gou, Shenzhen (CN); Xiaogang Han, Shenzhen (CN); Focai Peng, Shenzhen (CN); Yajun Zhao, Shenzhen (CN); Shuqiang Xia, Shenzhen (CN)

(73) Assignee: Xi'an Zhongxing New Software Co., Ltd (CN)

(*) Notice: Subject to any disclaimer, the term of this patent is extended or adjusted under 35 U.S.C. 154(b) by 23 days.

(21) Appl. No.: 15/323,430

(22) PCT Filed: Jun. 23, 2015

(86) PCT No.: PCT/CN2015/082126
§ 371 (c)(1),
(2) Date: Jan. 2, 2017

(87) PCT Pub. No.: WO2016/000549
PCT Pub. Date: Jan. 7, 2016

(65) Prior Publication Data
US 2017/0142740 A1   May 18, 2017

(30) Foreign Application Priority Data
Jul. 3, 2014 (CN) .......................... 2014 1 0315310

(51) Int. Cl.
*H04L 5/00* (2006.01)
*H04W 16/14* (2009.01)
(Continued)

(52) U.S. Cl.
CPC .......... *H04W 72/12* (2013.01); *H04L 5/0007* (2013.01); *H04W 72/0446* (2013.01);
(Continued)

(58) Field of Classification Search
CPC . H04W 72/12; H04W 72/0446; H04W 74/08; H04W 74/0891; H04W 16/14; H04L 5/0007
See application file for complete search history.

(56) References Cited

U.S. PATENT DOCUMENTS 8,787,273 B2    7/2014  Ishii
2004/0047319 A1  3/2004  Elg
(Continued)

FOREIGN PATENT DOCUMENTS

CN    101047432    10/2007
CN    101179460    5/2008
(Continued)

OTHER PUBLICATIONS

Korean Office Action dated Mar. 25, 2018 for Korean Application No. 10-2017-7003013.
(Continued)

*Primary Examiner* — Mohammad S Anwar
(74) *Attorney, Agent, or Firm* — Plumsea Law Group, LLC

(57) ABSTRACT

A resource obtaining method includes: obtaining a right to use an unlicensed carrier resource through a fallback operation in a contention time window; when the fallback operation in the contention time window succeeds, performing monitoring for a time length of T1; when it is found that the unlicensed carrier resource is idle through monitoring, determining that the obtaining of the right to use the unlicensed carrier resource succeeds. Also described are a station and a computer storage medium.

12 Claims, 6 Drawing Sheets

(51) Int. Cl.
*H04W 72/04* (2009.01)
*H04W 72/12* (2009.01)
*H04W 74/08* (2009.01)

(52) U.S. Cl.
CPC ............ *H04W 74/08* (2013.01); *H04W 16/14* (2013.01); *H04W 74/0891* (2013.01)

(56) References Cited

U.S. PATENT DOCUMENTS

| | | | | |
|---|---|---|---|---|
| 2010/0074263 | A1* | 3/2010 | Bry ..................... | H04L 12/2834 370/401 |
| 2011/0149881 | A1* | 6/2011 | Gong ................... | H04B 7/0452 370/329 |
| 2014/0036853 | A1* | 2/2014 | Kim ..................... | H04W 16/14 370/329 |
| 2015/0131536 | A1 | 5/2015 | Kaur et al. | |
| 2017/0142740 | A1 | 5/2017 | Gou et al. | |

FOREIGN PATENT DOCUMENTS

| | | |
|---|---|---|
| CN | 101179821 | 5/2008 |
| CN | 103370896 | 10/2013 |
| EP | 3154302 A1 | 4/2017 |
| KR | 20120079055 A | 7/2012 |
| KR | 20140010450 A | 1/2014 |
| RU | 2011108044 A | 9/2012 |
| WO | 2016/000549 A1 | 1/2016 |

OTHER PUBLICATIONS

Russian Office Action dated Mar. 16, 2018 for Russian Application No. 2017101546.
Russian Search Report dated Mar. 16, 2018 for Russian Application No. 2017101546.
International Search Report for PCT/CN2015/082126, English Translation attached to original, Both completed by the Chinese Patent Office dated Aug. 24, 2015, All together 5 Pages.
Office Action dated Oct. 18, 2017 for Canadian Patent Application No. 2954010.
Extended European Search Report for European Application No. EP 15814662.1, Completed by the European Patent Office, dated Jun. 19, 2017, 8 Pages.
Japanese Office Action dated Apr. 10, 2018 for Japanese Application No. 2017-500006.
Canadian Office Action dated Jun. 15, 2018 for Canadian Application No. 2,954,010.
"Considerations on LTE-U in Rel-13", 3 GPP RWS-140019, Jun. 7, 2014 (17pp).

* cited by examiner

RESOURCE OBTAINING METHOD, STATION AND COMPUTER STORAGE MEDIUM

CROSS-REFERENCE TO RELATED APPLICATION

This application is the U.S. national phase of PCT Application No. PCT/CN2015/082126 filed Jun. 23, 2015, which claims priority to Chinese Application No. 201410315310.2 filed Jul. 3, 2014, the disclosures of which are incorporated in their entirety by reference herein.

TECHNICAL FIELD

The present document relates to the field of wireless communication, in particular to a resource obtaining method, a station and a computer storage medium.

BACKGROUND OF THE RELATED ART

Up to now, as everyone knows, the Long Term Evolution (LTE) system is deployed in licensed carriers for operation. However, with the evolution of the LTE system, recently some companies (such as America Qualcomm Corporation) put forward a suggestion of carrying out a study on deployment of the LTE system in unlicensed carriers. However, up to now, it has not been accepted by relevant organizations of LTE and no project is established.

America Qualcomm Corporation gives the following main project establishment reasons: with the rapid increase of data service, licensed spectrums cannot bear such huge data volume in near future; and thus it is suggested that deploying LTE in unlicensed spectrum resources and sharing data traffic in licensed carriers should be considered through unlicensed spectrums.

If the LTE system operates in unlicensed carriers, according to regulatory policies of all countries on unlicensed carriers, when the LTE system uses unlicensed carriers, monitoring needs to be performed firstly and the unlicensed carriers shall not be used by the LTE system until it is monitored that the unlicensed carriers are idle. As a result, how to design a reasonable monitoring mechanism aiming at the LTE system to enable the LTE system to have the optimum efficiency of monitoring and obtaining the unlicensed carriers is a problem which needs to be urgently solved at present.

SUMMARY

In order to solve the technical problem existing in the existing technology, the embodiments of the present document provide a resource obtaining method, a station and a computer storage medium.

An embodiment of the present document provides a resource obtaining method, including:

obtaining a right to use an unlicensed carrier resource through a fallback operation in a contention time window; and when the fallback operation in the contention time window succeeds, performing monitoring for a time length of T1, and when it is found that the unlicensed carrier resource is idle through monitoring, determining that the obtaining of the right to use the unlicensed carrier resource succeeds.

An embodiment of the present document further provides a resource obtaining method, including:

obtaining a right to use an unlicensed carrier resource through a fallback operation in a contention time window; and when the fallback operation in the contention time window succeeds and it is determined that a time interval between a fallback moment selected during the fallback operation and a use end moment of the unlicensed carrier resource is greater than or equal to T2, determining that the obtaining of the right to use the unlicensed carrier resource succeeds.

An embodiment of the present document further provides a resource obtaining method, including:

obtaining a right to use an unlicensed carrier resource through a fallback operation in a contention time window; and in a process of obtaining the right to use the unlicensed carrier resource through the fallback operation in the contention time window, the method further includes:

when it is determined that a time interval between a selected fallback moment and a use end moment of the unlicensed carrier resource is greater than or equal to T3, performing the fallback operation to obtain the right to use the unlicensed carrier resource.

An embodiment of the present document further provides a resource obtaining method, including:

performing monitoring for a time length of T4 on an unlicensed carrier resource;

when it is found that the unlicensed carrier resource is idle through monitoring, obtaining a right to use the unlicensed carrier resource through a fallback operation in a contention time window; and when the obtaining of the right to use the unlicensed carrier resource in the contention time window succeeds, sending a channel occupation signal by using the unlicensed carrier resource.

An embodiment of the present document further provides a resource obtaining method, including:

performing monitoring for a time length of T5 on an unlicensed carrier resource; and when it is found that the unlicensed carrier resource is idle through monitoring, obtaining a right to use the unlicensed carrier resource directly through a fallback operation in a contention time window.

An embodiment of the present document further provides a station, including: a first obtaining unit, a first monitoring unit and a first determination unit, herein, the first obtaining unit is arranged to obtain a right to use an unlicensed carrier resource through a fallback operation in a contention time window;

the first monitoring unit is arranged to, when the fallback operation in the contention time window succeeds, perform monitoring for a time length of T1; and the first determination unit is arranged to, when it is found that the unlicensed carrier resource is idle through monitoring, determine that the obtaining of the right to use the unlicensed carrier resource succeeds.

An embodiment of the present document further provides a station, including: a second obtaining unit and a second determination unit, herein, the second obtaining unit is arranged to obtain a right to use an unlicensed carrier resource through a fallback operation in a contention time window; and the second determination unit is arranged to, when the fallback operation in the contention time window succeeds and it is determined that a time interval between a fallback moment selected during the fallback operation and a use end moment of the unlicensed carrier resource is greater than or equal to T2, determine that the obtaining of the right to use the unlicensed carrier resource succeeds.

An embodiment of the present document further provides a station, including: a third obtaining unit and a third determination unit, herein, the third obtaining unit is arranged to obtain a right to use an unlicensed carrier resource through a fallback operation in a contention time window; and the third determination unit is arranged to, in a process of obtaining the right to use the unlicensed carrier resource through the fallback operation in the contention time window, when it is determined that a time interval between a selected fallback moment and a use end moment of the unlicensed carrier resource is greater than or equal to T3, trigger the third obtaining unit to continue to perform the fallback operation to obtain the right to use the unlicensed carrier resource.

An embodiment of the present document further provides a station, including: a third monitoring unit, a fourth obtaining unit and a seventh sending unit, herein, the third monitoring unit is arranged to perform monitoring for a time length of T4 on an unlicensed carrier resource;

the fourth obtaining unit is arranged to, when it is found that the unlicensed carrier resource is idle through monitoring, obtain a right to use the unlicensed carrier resource through a fallback operation in a contention time window; and the seventh sending unit is arranged to, when the obtaining of the right to use the unlicensed carrier resource in the contention time window succeeds, send a channel occupation signal by using the unlicensed carrier resource.

An embodiment of the present document further provides a station, including: a fourth determination unit and a fifth obtaining unit, herein, the fourth determination unit is arranged to perform monitoring for a time length of T5 on an unlicensed carrier resource; and when it is found that the unlicensed carrier resource is idle through monitoring, trigger the fifth obtaining unit; and the fifth obtaining unit is arranged to obtain a right to use the unlicensed carrier resource directly through a fallback operation in a contention time window after receiving a trigger from the fourth determination unit.

The embodiment of the present document further provides a computer storage medium, including a group of instructions, which, when being executed, cause at least one processor to execute the above mentioned resource obtaining methods.

According to the resource obtaining methods, the stations and the computer storage medium provided by the embodiments of the present document, when the station which uses the unlicensed carrier resource ends the use of the unlicensed carrier resource, the right to use the unlicensed carrier resource is obtained through the fallback operation, and thereby the unlicensed carrier resource can be efficiently obtained.

BRIEF DESCRIPTION OF DRAWINGS

In the drawings (which are not necessarily drawn to scale), similar reference signs may describe similar parts in different views. Similar reference signs suffixed with different letters may represent different examples of similar parts. The drawings approximately illustrate all embodiments discussed in this text in an exemplary way instead of a restrictive way.

SPECIFIC EMBODIMENTS

Figure 1:
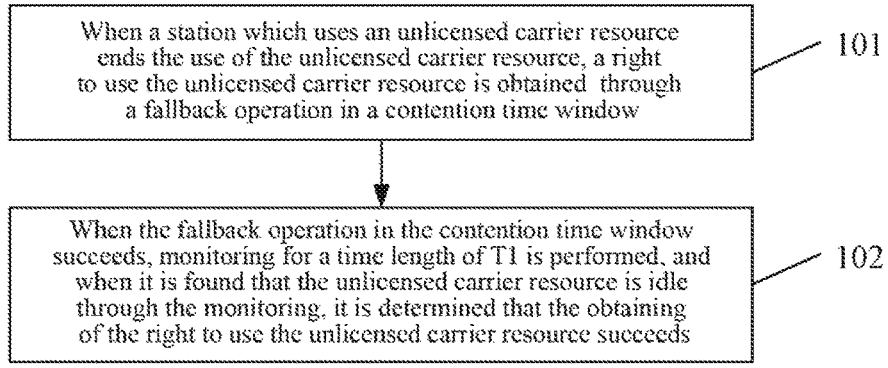
FIG. 1 illustrates a flowchart of a resource obtaining method according to embodiment 1 of the present document.

In order to better understand the contents of the present document, the present document firstly introduces basic features of unlicensed spectrum resources.

Unlicensed spectrum resources have many advantages, which are mainly reflected as follows:

1. It is free/low-cost. Specifically, since unlicensed spectrum resources do not need to be purchased, the cost of unlicensed spectrum resources is zero.

2. Admission requirements are low and the cost is low. Specifically, individuals and enterprises can participate in deployment and devices of device manufacturers may be any devices.

3. Resources are shared. Specifically, when multiple different systems operate in the same unlicensed spectrum resource or different operators of the same system operate in the same unlicensed spectrum resource, some resource sharing modes may be considered and thereby the efficiency of the spectrum resources can be improved.

4. There are many wireless access technologies. Specifically, the operation across different communication standards can be realized and network topologies are diversified.

5. There are many wireless access stations.

6. There are many applications. Specifically, many services such as Machine to Machine (M2M) service and Vehicle to Vehicle (V2V) service may operate in unlicensed spectrum resources.

The above-mentioned basic features of the unlicensed spectrum resources decide that the utilization of the unlicensed spectrum resources may be an important evolution direction of wireless communication systems.

If the LTE system operates in the unlicensed carriers, according to regulatory policies of all countries on unlicensed carriers, when the LTE system uses the unlicensed carriers, monitoring needs to be performed firstly and the unlicensed carriers shall not be used by the LTE system until it is monitored that the unlicensed carriers are idle. As a result, how to design a reasonable monitoring mechanism aiming at the LTE system to enable the LTE system to have the optimum efficiency of monitoring and obtaining the unlicensed carriers is a problem which needs to be urgently solved at present.

Based on this, in various embodiments of the present document, when a station which uses an unlicensed carrier resource ends the use of the unlicensed carrier resource, all stations obtain a right to use the unlicensed carrier resource through a fallback operation in a contention time window. In other words, the stations obtain the right to use the unlicensed carrier resource through the fallback operation in the contention time window. The present document provides detailed specific processes on how to obtain an unlicensed carrier through specific embodiments until it is determined that the obtaining of the right to use the unlicensed carrier resource succeeds.

In addition, an embodiment is also provided for data sending performed by the station, which obtains the unlicensed carrier resource, in the unlicensed carrier resource after the obtaining of the unlicensed carrier resource succeeds, including scheduling data by using the obtained unlicensed carrier resource until a next subframe starts.

Embodiment 1

A resource obtaining method provided by the present embodiment, as illustrated in FIG. 1, includes the following steps.

In step 101, when a station which uses an unlicensed carrier resource ends the use of the unlicensed carrier resource, a right to use the unlicensed carrier resource is obtained through a fallback operation in a contention time window.

Specifically, a station which needs to obtain the unlicensed carrier resource learns about a use situation of the unlicensed carrier resource used by a station which uses the unlicensed carrier resource, and when the station which uses the unlicensed carrier resource ends the use of the unlicensed carrier resource, the station which needs to obtain the unlicensed carrier resource obtains a right to use the unlicensed carrier resource through a fallback operation in a contention time window. Herein, the station which needs to obtain the unlicensed carrier resource may determine an end time point of the use of the unlicensed carrier resource used by the station which uses the unlicensed carrier resource according to received station time information which is sent by the station which uses the unlicensed carrier resource. A mode of monitoring the unlicensed carrier resource in real time may also be adopted, e.g., the station which needs to obtain the unlicensed carrier resource may monitor whether the unlicensed carrier resource is idle in real time, and if it is found that the unlicensed carrier resource is idle, the station which needs to obtain the unlicensed carrier resource determines that the station which uses the unlicensed carrier resource ends the use of the unlicensed carrier resource.

Herein, in actual application, when the station which needs to obtain the unlicensed carrier resource determines whether the station which uses the unlicensed carrier resource ends the use of the unlicensed carrier resource by adopting the mode of monitoring the unlicensed carrier resource in real time, this step may be specifically implemented through the following operations:

Whether the unlicensed carrier resource is idle is monitored in real time, and when it is found that the unlicensed carrier resource is idle, the station which needs to obtain the unlicensed carrier resource obtains the right to use the unlicensed carrier resource through the fallback operation in the contention time window.

The operation of obtaining the right to use the unlicensed carrier resource through the fallback operation in the contention time window specifically includes the following operations:

the station which needs to obtain the unlicensed carrier resource determines a fallback moment (selects a random fallback value) in the designated contention time window, and monitors the unlicensed carrier resource in the contention time window before the determined fallback moment (the fallback value is progressively decreased to 0); and when the determined fallback moment is reached (the fallback value is progressively decreased to 0) and it is found that the unlicensed carrier resource is idle through monitoring in the contention time window, a channel occupation signal is started to be sent by using the unlicensed carrier resource at the determined fallback moment. At this moment, it indicates that the station which needs to obtain the unlicensed carrier resource successfully obtains the unlicensed carrier resource.

Herein, an Orthogonal Frequency Division Multiplexing (OFDM) symbol in the contention time window uses a short Cyclic Prefix (CP).

A time length of the contention time window does not exceed 1 ms and may be (1−T1) ms, herein T1 is a designated time length, and a value range of T1 is greater than or equal to 0 and is less than the time length of the contention time window. In actual application, a value of T1 may be determined according to the time needed by a station to completely parse data once (i.e., the time spent by a station in processing a current data packet). Since difference in bandwidth may influence the time spent by the station in processing, different values may be defined aiming at different given bandwidths.

When the determined fallback moment is reached and it is found that the unlicensed carrier resource is idle through monitoring in the contention time window, it indicates that the station which needs to obtain the unlicensed carrier resource successfully obtains the unlicensed carrier resource; and when the determined fallback moment is reached and it is found that the unlicensed carrier resource is busy through monitoring, it indicates that the station which needs to obtain the unlicensed carrier resource fails to obtain the unlicensed carrier resource, and a subsequent operation is stopped.

Here, the situation that it is found that the unlicensed carrier resource is busy through monitoring refers to that: the station which needs to obtain the unlicensed carrier resource receives a signal in the unlicensed carrier resource and learns about that there is a signal sent by another station in the unlicensed carrier resource by parsing the signal; or receives a signal in the unlicensed carrier resource, and determines that energy of the unlicensed carrier resource exceeds a set energy threshold through energy detection.

Correspondingly, the situation that it is found that the unlicensed carrier resource is idle through monitoring refers to that: the station which needs to obtain the unlicensed carrier resource receives a signal in the unlicensed carrier resource and learns about that there is no signal sent by other stations in the unlicensed carrier resource by parsing the signal; or receives a signal in the unlicensed carrier resource, and determines that energy of the unlicensed carrier resource does not exceed a set energy threshold through energy detection.

The operation of determining the fallback moment in the designated contention time window is specifically:

dividing the contention time window into N parts and sequentially numbering as 0 to N−1; and randomly generating a numerical value M between 0 and N−1, herein a moment corresponding to M is the determined fallback moment.

Herein, the operation of randomly generating the numerical value M between 0 and N−1 includes randomly generating a numerical value between 0 and 1 and then mapping to obtain the numerical value M between 0 and N−1.

Here, a time length of each part of the N parts may be a time length of one OFDM symbol, or half OFDM symbol or ¼ OFDM symbol.

When a situation that a single operator deploys the LTE system in unlicensed carriers at this geographical location is considered only, by selecting an interference situation between neighboring or distant cells according to characteristics of cellular cell deployment, the following modes of determining the time length of each part of the N parts may be given:

In one embodiment, the time length of each part does not exceed the contention time window/37 ms and may be (1−T1)/37 ms.

In one embodiment, the time length of each part does not exceed the contention time window/19 ms and may be (1−T1)/19 ms.

In one embodiment, the time length of each part does not exceed the contention time window/7 ms and may be (1−T1)/7 ms.

When a situation that multiple operators simultaneously deploy the LTE system in unlicensed carriers at this geographical location is considered, by selecting an interference situation between neighboring or distant cells according to characteristics of cellular cell deployment in consideration of the number of supported operators, e.g., two supported operators, the time length of each corresponding part is as follows:

In one embodiment, the time length of each part does not exceed the contention time window/(37*2) ms and may be (1−T1)/(37*2) ms.

In one embodiment, the time length of each part does not exceed the contention time window/(19*2) ms and may be (1−T1)/(19*2) ms.

In one embodiment, the time length of each part does not exceed the contention time window/(7*2) ms and may be (1−T1)/(7*2) ms.

In one embodiment, the time length of each part may be set according to system bandwidths of different unlicensed carrier resources. Specifically, the time length of each part is set to be K, and when the system bandwidth of the unlicensed carrier resource is 20M, the minimum value of K is 9 μs; when the system bandwidth of the unlicensed carrier resource is 10M, the minimum value of K is 13 μs; and when the system bandwidth of the unlicensed carrier resource is 5M, the minimum value of K is 21 μs.

The channel occupation signal may be at least one of the following: time information about occupation of the unlicensed carrier resource, a Beacon signal for channel occupation, a reference signal, etc. Here, the reference signal may be a reference signal for a synchronization purpose, a reference signal for a measurement purpose, etc.

In step 102, when the fallback operation in the contention time window succeeds, monitoring for a time length of T1 is performed, and when it is found that the unlicensed carrier resource is idle through monitoring, it is determined that the obtaining of the right to use the unlicensed carrier resource succeeds.

Here, the situation that the fallback operation succeeds refers to that the randomly generated fallback value is progressively decreased to 0.

When monitoring for the time length of T1 is performed and it is found that that the unlicensed carrier resource is idle through monitoring, before a next subframe comes, the method may further include the following operation:

A channel occupation signal is sent by using the unlicensed carrier resource till a start moment of the next subframe.

A time length of T1 may be one OFDM symbol or half OFDM symbol or is not less than 20 μs.

Herein, the station which needs to obtain the unlicensed carrier resource performs monitoring for a time length of T1 on the unlicensed carrier resource, and when a monitoring result is that the unlicensed carrier resource is idle, it is determined that the obtaining of the right to use the unlicensed carrier resource succeeds; and when the monitoring result is that the unlicensed carrier resource is partially or completely busy, it is determined that the obtaining of the right to use the unlicensed carrier resource fails, the sending of the channel occupation signal in the unlicensed carrier resource is stopped and it is considered that the unlicensed carrier resource is used by another station (including a main system). By adopting this mode, it is continuous between the contention time window for the fallback operation and the end time point of the use of the unlicensed carrier resource used by another station. The time length T1 for monitoring is set to be after the fallback operation, at this moment only the station which successfully obtains the unlicensed carrier resource through contention performs monitoring, the number of stations which perform monitoring is greatly reduced and thereby stations which do not participate in monitoring can better perform data scheduling by using licensed carrier resources. At this moment, monitoring is mainly used for finding whether the main system uses the unlicensed carrier resource. Herein, the main system is a system with a higher priority, e.g., a military radar system.

The method may further include the following step:

When the station which needs to obtain the unlicensed carrier resource determines that the obtaining of the right to use the unlicensed carrier resource succeeds and until a next subframe starts, data are scheduled or transmitted by using the obtained unlicensed carrier resource.

Here, a time start point that the station which needs to obtain the unlicensed carrier resource occupies the unlicensed carrier resource is a start point of the next subframe.

When the station which needs to obtain the unlicensed carrier resource determines that the obtaining of the right to use the unlicensed carrier resource succeeds and until a next subframe starts, control signaling is sent by using the obtained unlicensed carrier resource to schedule UE data, or control signaling is sent by using a licensed carrier resource paired with the unlicensed carrier resource to schedule UE data to be transmitted in the unlicensed carrier resource.

Herein, only when it is determined that the obtaining of the right to use the unlicensed carrier resource succeeds and until a next subframe starts, the station which needs to obtain the unlicensed carrier resource is allowed to send control signaling by using the obtained unlicensed carrier resource to schedule UE data. This is because that the LTE system is a synchronized system, i.e., uniform subframes are needed to align a time start point. In other words, the scheduling of the LTE system is performed by taking subframe as a unit. Therefore, when the station which needs to obtain the unlicensed carrier resource successfully obtains the unlicensed carrier resource and a next subframe still does not come, the station which needs to obtain the unlicensed carrier resource cannot schedule UE data. However, the station which needs to obtain the unlicensed carrier resource may send some signals such as time information about occupation of the unlicensed carrier resource, beacon signals for channel occupation and various reference signals, etc. The effect of sending these signals is mainly to enable other systems (e.g., WIFI system) to monitor that the unlicensed carrier resource is busy, so as to prevent these systems from occupying the unlicensed carrier resource which has already been obtained by the station which needs to obtain the unlicensed carrier resource. If there is no other system at the station which needs to obtain the unlicensed carrier resource, e.g., there are only the LTE-U (which is called so when LTE operates on unlicensed carriers) systems, the station which needs to obtain the unlicensed carrier resource may not send a channel occupation signal within a period of time from a moment when the obtaining of the unlicensed carrier resource succeeds to a start moment of a next subframe. This is because that the following agreement may be made between the LTE-U systems: if other stations consider that the obtaining of resources fails, the other stations will not obtain the unlicensed resource on this frequency point any longer until the moment of the next subframe, but may receive a signal sent by the station which needs to obtain the unlicensed carrier resource (if the station which needs to obtain the unlicensed carrier resource sends the channel occupation signal).

The control signaling may be Downlink Control Information (DCI); and the time information about the occupation of the unlicensed carrier resource may also be notified to other stations by using DCI. Necessary reference signals are also started to be sent from the next subframe.

The station described in the present embodiment may be a base station, etc., and generally refers to a device that uses unlicensed carriers.

According to the resource obtaining method provided by the embodiment of the present document, when the station which uses the unlicensed carrier resource ends the use of the unlicensed carrier resource, the right to use the unlicensed carrier resource is obtained through the fallback operation in the contention time window; and when the fallback operation in the contention time window succeeds, monitoring for the time length of T1 is performed, and when it is found that the unlicensed carrier resource is idle through monitoring, it is determined that the obtaining of the right to use the unlicensed carrier resource succeeds. The frame structure provided by the embodiment of the present document is a listen-before-talk frame structure, the solution provided by the embodiment of the present document is a solution of a listen-before-talk mechanism, and by using the frame structure and the corresponding method provided by the embodiment of the present document, unlicensed carrier resources can be efficiently obtained.

The resource obtaining method provided by the embodiment of the present document enables the LTE system to be more efficient in the contention for unlicensed carrier resources.

In addition, the resource obtaining method provided by the embodiment of the present document is also applicable to WIFI systems.

Embodiment 2

Figure 2:
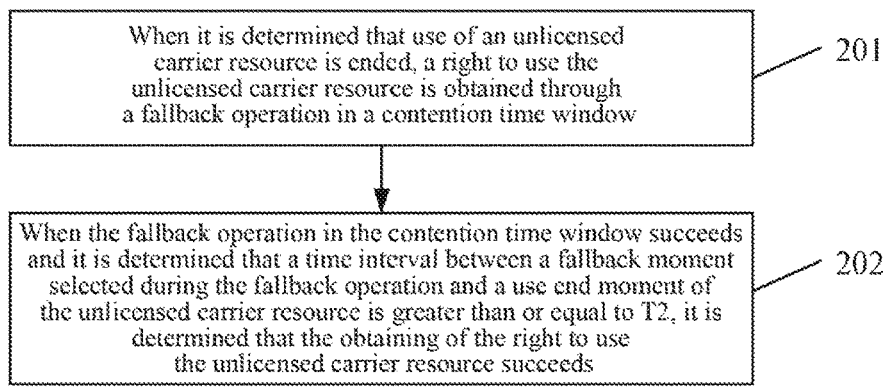
FIG. 2 illustrates a flowchart of a resource obtaining method according to embodiment 2 of the present document.

A resource obtaining method provided by the present embodiment, as illustrated in FIG. 2, includes the following steps.

In step 201, when it is determined that use of an unlicensed carrier resource is ended, a right to use the unlicensed carrier resource is obtained through a fallback operation in a contention time window.

Specifically, a station which needs to obtain the unlicensed carrier resource learns about a use situation of the unlicensed carrier resource used by a station which uses the unlicensed carrier resource, and when the station which uses the unlicensed carrier resource ends the use of the unlicensed carrier resource, the station which needs to obtain the unlicensed carrier resource obtains a right to use the unlicensed carrier resource through a fallback operation in a contention time window. Herein, the station which needs to obtain the unlicensed carrier resource may determine an end time point of the use of the unlicensed carrier resource used by the station which uses the unlicensed carrier resource according to received station time information which is sent by the station which uses the unlicensed carrier resource. A mode of monitoring the unlicensed carrier resource in real time may also be adopted, e.g., the station which needs to obtain the unlicensed carrier resource may monitor whether the unlicensed carrier resource is idle in real time, and if it is found that the unlicensed carrier resource is idle, the station which needs to obtain the unlicensed carrier resource determines that the station which uses the unlicensed carrier resource ends the use of the unlicensed carrier resource.

Herein, in actual application, when the station which needs to obtain the unlicensed carrier resource determines whether the station which uses the unlicensed carrier resource ends the use of the unlicensed carrier resource by adopting the mode of monitoring the unlicensed carrier resource in real time, this step may be specifically implemented through the following operations:

Whether the unlicensed carrier resource is idle is monitored in real time, and when it is found that the unlicensed carrier resource is idle, the station which needs to obtain the unlicensed carrier resource obtains the right to use the unlicensed carrier resource through the fallback operation in the contention time window.

The operation of obtaining the right to use the unlicensed carrier resource through the fallback operation in the contention time window specifically includes the following operations:

the station which needs to obtain the unlicensed carrier resource determines a fallback moment (selects a random fallback value) in the designated contention time window, and monitors the unlicensed carrier resource in the contention time window before the determined fallback moment (the fallback value is progressively decreased to 0); and when the determined fallback moment is reached (the fallback value is progressively decreased to 0) and it is found that the unlicensed carrier resource is idle through monitoring in the contention time window, a channel occupation signal is started to be sent by using the unlicensed carrier resource at the determined fallback moment. At this moment, it indicates that the station which needs to obtain the unlicensed carrier resource successfully obtains the unlicensed carrier resource.

Herein, an OFDM symbol in the contention time window uses a short CP.

A time length of the contention time window does not exceed 1 ms and may be (1−T2) ms, herein T2 is a designated time length, and a value range of T2 is greater than or equal to 0 and is less than the time length of the contention time window. In actual application, a value of T2 may be determined according to the time needed by a station to completely parse data once (i.e., the time spent by a station in processing a current data packet). Since difference in bandwidth may influence the time spent by the station in processing, different values may be defined aiming at different given bandwidths.

When the determined fallback moment is reached and it is found that the unlicensed carrier resource is idle through monitoring in the contention time window, it indicates that the station which needs to obtain the unlicensed carrier resource successfully obtains the unlicensed carrier resource, i.e., the fallback operation succeeds; and when the determined fallback moment is reached and it is found that the unlicensed carrier resource is busy through monitoring, it indicates that the station which needs to obtain the unlicensed carrier resource fails to obtain the unlicensed carrier resource, i.e., the fallback operation fails, and a subsequent operation is stopped.

Here, the situation that it is found that the unlicensed carrier resource is busy through monitoring refers to that: the station which needs to obtain the unlicensed carrier resource receives a signal in the unlicensed carrier resource and learns about that there is a signal sent by another station in the unlicensed carrier resource by parsing the signal; or receives a signal in the unlicensed carrier resource, and determines that energy of the unlicensed carrier resource exceeds a set energy threshold through energy detection.

Correspondingly, the situation that it is found that the unlicensed carrier resource is idle through monitoring refers to that: the station which needs to obtain the unlicensed carrier resource receives a signal in the unlicensed carrier resource and learns about that there is no signal sent by other stations in the unlicensed carrier resource by parsing the signal; or receives a signal in the unlicensed carrier resource, and determines that energy of the unlicensed carrier resource does not exceed a set energy threshold through energy detection.

The operation of determining the fallback moment in the designated contention time window is specifically:

dividing the contention time window into N parts and sequentially numbering as 0 to N−1; and randomly generating a numerical value M between 0 and N−1, herein a moment corresponding to M is the determined fallback moment.

Herein, the operation of randomly generating the numerical value M between 0 and N−1 includes randomly generating a numerical value between 0 and 1 and then mapping to obtain the numerical value M between 0 and N−1.

Here, a time length of each part of the N parts may be a time length of one OFDM symbol, or half OFDM symbol or ¼ OFDM symbol.

When a situation that a single operator deploys the LTE system in unlicensed carriers at this geographical location is considered only, by selecting an interference situation between neighboring or distant cells according to characteristics of cellular cell deployment, the following modes of determining the time length of each part of the N parts may be given:

In one embodiment, the time length of each part does not exceed the contention time window/37 ms and may be (1−T2)/37 ms.

In one embodiment, the time length of each part does not exceed the contention time window/19 ms and may be (1−T2)/19 ms.

In one embodiment, the time length of each part does not exceed the contention time window/7 ms and may be (1−T2)/7 ms.

When a situation that multiple operators simultaneously deploy the LTE system in unlicensed carriers at this geographical location is considered, by selecting an interference situation between neighboring or distant cells according to characteristics of cellular cell deployment in consideration of the number of supported operators, e.g., two supported operators, the time length of each corresponding part is as follows:

In one embodiment, the time length of each part does not exceed the contention time window/(37*2) ms and may be (1−T2)/(37*2) ms.

In one embodiment, the time length of each part does not exceed the contention time window/(19*2) ms and may be (1−T2)/(19*2) ms.

In one embodiment, the time length of each part does not exceed the contention time window/(7*2) ms and may be (1−T2)/(7*2) ms.

In one embodiment, the time length of each part may be set according to system bandwidths of different unlicensed carrier resources. Specifically, the time length of each part is set to be K, and when the system bandwidth of the unlicensed carrier resource is 20M, the minimum value of K is 9 μs; when the system bandwidth of the unlicensed carrier resource is 10M, the minimum value of K is 13 μs; and when the system bandwidth of the unlicensed carrier resource is 5M, the minimum value of K is 21 μs.

The channel occupation signal may be at least one of the following: time information about occupation of the unlicensed carrier resource, a Beacon signal for channel occupation, a reference signal, etc. Here, the reference signal may be a reference signal for a synchronization purpose, a reference signal for a measurement purpose, etc.

In step 202, when the fallback operation in the contention time window succeeds and it is determined that a time interval between a fallback moment selected during the fallback operation and a use end moment of the unlicensed carrier resource is greater than or equal to T2, it is determined that the obtaining of the right to use the unlicensed carrier resource succeeds.

Here, the situation that the fallback operation succeeds refers to that the randomly generated fallback value is progressively decreased to 0.

The use end moment of the unlicensed carrier resource refers to: a moment when other stations which use the unlicensed carrier resource end the use of the unlicensed carrier resource.

In one embodiment, in the LTE system, the time interval between the fallback moment selected during the fallback operation and the use end moment of the unlicensed carrier resource may be a time interval between the fallback moment selected during the fallback operation and a previous subframe.

After the fallback operation in the contention time window succeeds, the station which needs to obtain the unlicensed carrier resource judges whether the time interval between the fallback moment selected during the fallback operation and the use end moment of the unlicensed carrier resource is greater than or equal to T2, and when it is determined that the time interval is greater than or equal to T2, it is considered that the obtaining of the right to use the unlicensed carrier resource succeeds; when it is determined that the time interval is less than T2, monitoring for a time length of T2 is performed; when it is found that the unlicensed carrier resource is idle through monitoring, it is considered that the obtaining of the right to use the unlicensed carrier resource succeeds, and when it is found that the unlicensed carrier resource is busy through monitoring, it is considered that the obtaining of the right to use the unlicensed carrier resource fails; and when it is found that the unlicensed carrier resource is idle through monitoring and a time point of the end of monitoring for the time length of T2 still does not reach a start moment of a next subframe, the channel occupation signal is sent by using the unlicensed carrier resource till the start moment of the next subframe.

Herein, the station which needs to obtain the unlicensed carrier resource performs monitoring for a time length of T2 on the unlicensed carrier resource, and when a monitoring result is that the unlicensed carrier resource is idle, it is determined that the obtaining of the right to use the unlicensed carrier resource succeeds; and when the monitoring result is that the unlicensed carrier resource is partially or completely busy, it is determined that the obtaining of the right to use the unlicensed carrier resource fails, the sending of the channel occupation signal in the unlicensed carrier resource is stopped and it is considered that the unlicensed carrier resource is used by another station (including a main system). By adopting this mode, it is continuous between the contention time window for the fallback operation and the end time point of the use of the unlicensed carrier resource used by another station. The time length $T_2$ for monitoring is set to be after the fallback operation, at this moment only the station which successfully obtains the unlicensed carrier resource through contention performs monitoring, the number of stations which perform monitoring is greatly reduced and thereby stations which do not participate in monitoring can better perform data scheduling by using licensed carrier resources. At this moment, monitoring is mainly used for finding whether the main system uses the unlicensed carrier resource. Herein, the main system is a system with a higher priority, e.g., a military radar system.

A time length of T2 may be one OFDM symbol or half OFDM symbol or is not less than 20 µs.

The method may further include:

When the station which needs to obtain the unlicensed carrier resource determines that the obtaining of the right to use the unlicensed carrier resource succeeds and until a next subframe starts, data are scheduled by using the obtained unlicensed carrier resource.

Here, a time start point that the station which needs to obtain the unlicensed carrier resource occupies the unlicensed carrier resource is a start point of the next subframe.

When the station which needs to obtain the unlicensed carrier resource determines that the obtaining of the right to use the unlicensed carrier resource succeeds and until a next subframe starts, control signaling is sent by using the obtained unlicensed carrier resource to schedule UE data, or control signaling is sent by using a licensed carrier resource paired with the unlicensed carrier resource to schedule UE data to be transmitted in the unlicensed carrier resource.

Herein, only when it is determined that the obtaining of the right to use the unlicensed carrier resource succeeds and until a next subframe starts, the station which needs to obtain the unlicensed carrier resource is allowed to send control signaling by using the obtained unlicensed carrier resource to schedule UE data. This is because that the LTE system is a synchronized system, i.e., uniform subframes are needed to align a time start point. In other words, the scheduling of the LTE system is performed by taking subframe as a unit. Therefore, when the station which needs to obtain the unlicensed carrier resource successfully obtains the unlicensed carrier resource and a next subframe still does not come, the station which needs to obtain the unlicensed carrier resource cannot schedule UE data. However, the station which needs to obtain the unlicensed carrier resource may send some signals such as time information about occupation of the unlicensed carrier resource, beacon signals for channel occupation and various reference signals, etc. The effect of sending these signals is mainly to enable other systems (e.g., WIFI system) to monitor that the unlicensed carrier resource is busy, so as to prevent these systems from occupying the unlicensed carrier resource which has already been obtained by the station which needs to obtain the unlicensed carrier resource. If there is no other system at the station which needs to obtain the unlicensed carrier resource, e.g., there are only the LTE-U (which is called so when LTE operates on unlicensed carriers) systems, the station which needs to obtain the unlicensed carrier resource may not send a channel occupation signal within a period of time from a moment when the obtaining of the unlicensed carrier resource succeeds to a start moment of a next subframe. This is because that the following agreement may be made between the LTE-U systems: if other stations consider that the obtaining of resources fails, the other stations will not obtain the unlicensed resource on this frequency point any longer until the moment of the next subframe, but may receive a signal sent by the station which needs to obtain the unlicensed carrier resource (if the station which needs to obtain the unlicensed carrier resource sends the channel occupation signal).

The control signaling may be DCI; and the time information about the occupation of the unlicensed carrier resource may also be notified to other stations by using DCI. Necessary reference signals are also started to be sent from the next subframe.

The station described in the present embodiment may be a base station, etc., and generally refers to a device that uses unlicensed carriers.

According to the resource obtaining method provided by the embodiment of the present document, when the station which uses the unlicensed carrier resource ends the use of the unlicensed carrier resource, the right to use the unlicensed carrier resource is obtained through the fallback operation in the contention time window; and when the fallback operation in the contention time window succeeds and it is determined that the time interval between the fallback moment selected during the fallback operation and the use end moment of the unlicensed carrier resource is greater than or equal to T2, it is determined that the obtaining of the right to use the unlicensed carrier resource succeeds. The frame structure provided by the embodiment of the present document is a listen-before-talk frame structure, the solution provided by the embodiment of the present document is a solution of a listen-before-talk mechanism, and by using the frame structure and the corresponding method provided by the embodiment of the present document, unlicensed carrier resources can be efficiently obtained.

The resource obtaining method provided by the embodiment of the present document enables the LTE system to be more efficient in the contention for unlicensed carrier resources.

In addition, the resource obtaining method provided by the embodiment of the present document is also applicable to WIFI systems.

Embodiment 3

Figure 3:
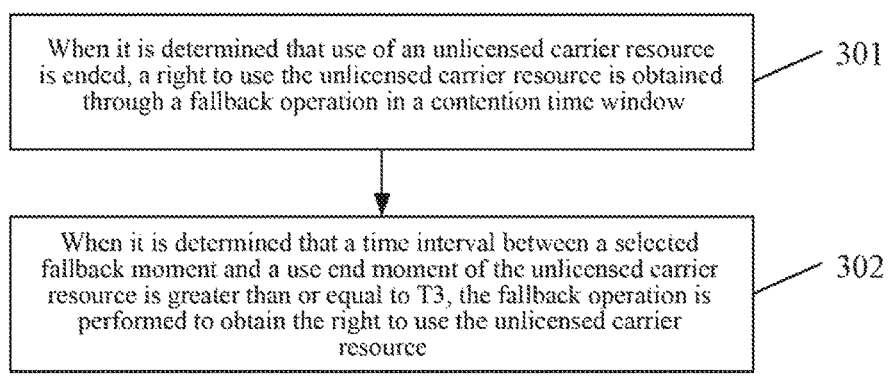
FIG. 3 illustrates a flowchart of a resource obtaining method according to embodiment 3 of the present document.

A resource obtaining method provided by the present embodiment, as illustrated in FIG. 3, includes the following steps.

In step 301, when it is determined that use of an unlicensed carrier resource is ended, a right to use the unlicensed carrier resource is obtained through a fallback operation in a contention time window.

Specifically, a station which needs to obtain the unlicensed carrier resource learns about a use situation of the unlicensed carrier resource used by a station which uses the unlicensed carrier resource, and when the station which uses the unlicensed carrier resource ends the use of the unlicensed carrier resource, the station which needs to obtain the unlicensed carrier resource obtains a right to use the unlicensed carrier resource through a fallback operation in a contention time window. Herein, the station which needs to obtain the unlicensed carrier resource may determine an end time point of the use of the unlicensed carrier resource used by the station which uses the unlicensed carrier resource according to received station time information which is sent by the station which uses the unlicensed carrier resource. A mode of monitoring the unlicensed carrier resource in real time may also be adopted, e.g., the station which needs to obtain the unlicensed carrier resource may monitor whether the unlicensed carrier resource is idle in real time, and if it is found that the unlicensed carrier resource is idle, the station which needs to obtain the unlicensed carrier resource determines that the station which uses the unlicensed carrier resource ends the use of the unlicensed carrier resource.

Herein, in actual application, when the station which needs to obtain the unlicensed carrier resource determines whether the station which uses the unlicensed carrier resource ends the use of the unlicensed carrier resource by adopting the mode of monitoring the unlicensed carrier resource in real time, this step may be specifically implemented through the following operations:

Whether the unlicensed carrier resource is idle is monitored in real time, and when it is found that the unlicensed carrier resource is idle, the station which needs to obtain the unlicensed carrier resource obtains the right to use the unlicensed carrier resource through the fallback operation in the contention time window.

The operation of obtaining the right to use the unlicensed carrier resource through the fallback operation in the contention time window specifically includes the following operations:

the station which needs to obtain the unlicensed carrier resource determines a fallback moment (selects a random fallback value) in the designated contention time window, and monitors the unlicensed carrier resource in the contention time window before the determined fallback moment (the fallback value is progressively decreased to 0); and when the determined fallback moment is reached (the fallback value is progressively decreased to 0) and it is found that the unlicensed carrier resource is idle through monitoring in the contention time window, a channel occupation signal is started to be sent by using the unlicensed carrier resource at the determined fallback moment. At this moment, it indicates that the station which needs to obtain the unlicensed carrier resource successfully obtains the unlicensed carrier resource.

Herein, an OFDM symbol in the contention time window uses a short CP.

A time length of the contention time window does not exceed 1 ms and may be (1−T3) ms, herein T3 is a designated time length, and a value range of T3 is greater than or equal to 0 and is less than the time length of the contention time window. In actual application, a value of T3 may be determined according to the time needed by a station to completely parse data once (i.e., the time spent by a station in processing a current data packet). Since difference in bandwidth may influence the time spent by the station in processing, different values may be defined aiming at different given bandwidths.

When the determined fallback moment is reached and it is found that the unlicensed carrier resource is idle through monitoring in the contention time window, it indicates that the station which needs to obtain the unlicensed carrier resource successfully obtains the unlicensed carrier resource; and when the determined fallback moment is reached and it is found that the unlicensed carrier resource is busy through monitoring, it indicates that the station which needs to obtain the unlicensed carrier resource fails to obtain the unlicensed carrier resource, and a subsequent operation is stopped.

Here, the situation that it is found that the unlicensed carrier resource is busy through monitoring refers to that: the station which needs to obtain the unlicensed carrier resource receives a signal in the unlicensed carrier resource and learns about that there is a signal sent by another station in the unlicensed carrier resource by parsing the signal; or receives a signal in the unlicensed carrier resource, and determines that energy of the unlicensed carrier resource exceeds a set energy threshold through energy detection.

Correspondingly, the situation that it is found that the unlicensed carrier resource is idle through monitoring refers to that: the station which needs to obtain the unlicensed carrier resource receives a signal in the unlicensed carrier resource and learns about that there is no signal sent by other stations in the unlicensed carrier resource by parsing the signal; or receives a signal in the unlicensed carrier resource, and determines that energy of the unlicensed carrier resource does not exceed a set energy threshold through energy detection.

The operation of determining the fallback moment in the designated contention time window is specifically:

dividing the contention time window into N parts and sequentially numbering as 0 to N−1; and randomly generating a numerical value M between 0 and N−1, herein a moment corresponding to M is the determined fallback moment.

Herein, the operation of randomly generating the numerical value M between 0 and N−1 includes randomly generating a numerical value between 0 and N−1 and then mapping to obtain the numerical value M between 0 and N−1.

Here, a time length of each part of the N parts may be a time length of one OFDM symbol, or half OFDM symbol or ¼ OFDM symbol.

When a situation that a single operator deploys the LTE system in unlicensed carriers at this geographical location is considered only, by selecting an interference situation between neighboring or distant cells according to characteristics of cellular cell deployment, the following modes of determining the time length of each part of the N parts may be given:

In one embodiment, the time length of each part does not exceed the contention time window/37 ms and may be (1−T3)/37 ms.

In one embodiment, the time length of each part does not exceed the contention time window/19 ms and may be (1−T3)/19 ms.

In one embodiment, the time length of each part does not exceed the contention time window/7 ms and may be (1−T3)/7 ms.

When a situation that multiple operators simultaneously deploy the LTE system in unlicensed carriers at this geographical location is considered, by selecting an interference situation between neighboring or distant cells according to characteristics of cellular cell deployment in consideration of the number of supported operators, e.g., two supported operators, the time length of each corresponding part is as follows:

In one embodiment, the time length of each part does not exceed the contention time window/(37*2) ms and may be (1−T3)/(37*2) ms.

In one embodiment, the time length of each part does not exceed the contention time window/(19*2) ms and may be (1−T3)/(19*2) ms.

In one embodiment, the time length of each part does not exceed the contention time window/(7*2) ms and may be (1−T3)/(7*2) ms.

In one embodiment, the time length of each part may be set according to system bandwidths of different unlicensed carrier resources. Specifically, the time length of each part is set to be K, and when the system bandwidth of the unlicensed carrier resource is 20M, the minimum value of K is 9 μs; when the system bandwidth of the unlicensed carrier resource is 10M, the minimum value of K is 13 μs; and when the system bandwidth of the unlicensed carrier resource is 5M, the minimum value of K is 21 μs.

The channel occupation signal may be at least one of the following: time information about occupation of the unlicensed carrier resource, a Beacon signal for channel occupation, a reference signal, etc. Here, the reference signal may be a reference signal for a synchronization purpose, a reference signal for a measurement purpose, etc.

In step 302, in a process of obtaining the right to use the unlicensed carrier resource through the fallback operation in the contention time window, when it is determined that a time interval between a selected fallback moment and a use end moment of the unlicensed carrier resource is greater than or equal to T3, the fallback operation is performed to obtain the right to use the unlicensed carrier resource.

Herein, when it is determined that a time interval between the determined fallback moment and the use end moment of the unlicensed carrier resource is greater than or equal to T3, the station which needs to obtain the unlicensed carrier resource uses T3 as the selected fallback moment and continues to perform the fallback operation; or stops the fallback operation and considers that the obtaining of the right to use the unlicensed carrier resource fails.

Herein, the situation that the fallback operation succeeds refers to that the randomly generated fallback value is progressively decreased to 0.

In actual application, when it is determined that the time interval between the determined fallback moment and the start moment of the contention time window is less than T3, the station which needs to obtain the unlicensed carrier resource is set such that a probability of successfully obtaining the unlicensed carrier resource through contention at a next time is greatly improved, i.e., the station which needs to obtain the unlicensed carrier resource is set to have a higher probability of obtaining the unlicensed carrier resource than other stations. For example, the contention time window of the station which needs to obtain the unlicensed carrier resource at a next time of contention may be set to be relatively small (but greater than T3), and the fallback moment selected by the station which needs to obtain the unlicensed carrier resource may be set to be just after moment T3; or, the station which needs to obtain the unlicensed carrier resource adjusts the selected fallback moment to be a first moment after moment T3 and obtains the unlicensed carrier resource again through the fallback operation.

A time length of T3 may be one OFDM symbol or half OFDM symbol or is not less than 20 μs.

After the obtaining of the right to use the unlicensed carrier resource through the fallback operation succeeds and before a next subframe comes, the method may further include the following step:

A channel occupation signal is sent by using the unlicensed carrier resource till a start moment of the next subframe.

The method may further include the following step:

When it is determined that the obtaining of the right to use the unlicensed carrier resource succeeds and until a next subframe starts, data are scheduled by using the obtained unlicensed carrier resource.

Here, a time start point that the station which needs to obtain the unlicensed carrier resource occupies the unlicensed carrier resource is a start point of the next subframe.

When the station which needs to obtain the unlicensed carrier resource determines that the obtaining of the right to use the unlicensed carrier resource succeeds and until a next subframe starts, control signaling is sent by using the obtained unlicensed carrier resource to schedule UE data, or control signaling is sent by using a licensed carrier resource paired with the unlicensed carrier resource to schedule UE data to be transmitted in the unlicensed carrier resource.

Herein, only when it is determined that the obtaining of the right to use the unlicensed carrier resource succeeds and until a next subframe starts, the station which needs to obtain the unlicensed carrier resource is allowed to send control signaling by using the obtained unlicensed carrier resource to schedule UE data. This is because that the LTE system is a synchronized system, i.e., uniform subframes are needed to align a time start point. In other words, the scheduling of the LTE system is performed by taking subframe as a unit. Therefore, when the station which needs to obtain the unlicensed carrier resource successfully obtains the unlicensed carrier resource and a next subframe still does not come, the station which needs to obtain the unlicensed carrier resource cannot schedule UE data. However, the station which needs to obtain the unlicensed carrier resource may send some signals such as time information about occupation of the unlicensed carrier resource, beacon signals for channel occupation and various reference signals, etc. The effect of sending these signals is mainly to enable other systems (e.g., WIFI system) to monitor that the unlicensed carrier resource is busy, so as to prevent these systems from occupying the unlicensed carrier resource which has already been obtained by the station which needs to obtain the unlicensed carrier resource. If there is no other system at the station which needs to obtain the unlicensed carrier resource, e.g., there are only the LTE-U (which is called so when LTE operates on unlicensed carriers) systems, the station which needs to obtain the unlicensed carrier resource may not send a channel occupation signal within a period of time from a moment when the obtaining of the unlicensed carrier resource succeeds to a start moment of a next subframe. This is because that the following agreement may be made between the LTE-U systems: if other stations consider that the obtaining of resources fails, the other stations will not obtain the unlicensed resource on this frequency point any longer until the moment of the next subframe, but may receive a signal sent by the station which needs to obtain the unlicensed carrier resource (if the station which needs to obtain the unlicensed carrier resource sends the channel occupation signal).

The control signaling may be DCI; and the time information about the occupation of the unlicensed carrier resource may also be notified to other stations by using DCI. Necessary reference signals are also started to be sent from the next subframe.

The station described in the present embodiment may be a base station, etc., and generally refers to a device that uses unlicensed carriers.

According to the resource obtaining method provided by the embodiment of the present document, when it is determined that the use of the unlicensed carrier resource is ended, the right to use the unlicensed carrier resource is obtained through the fallback operation in the contention time window; and in the process of obtaining the right to use the unlicensed carrier resource through the fallback operation in the contention time window, when it is determined that the time interval between the selected fallback moment and the use end moment of the unlicensed carrier resource is greater than or equal to T3, the fallback operation is performed to obtain the right to use the unlicensed carrier resource. The frame structure provided by the embodiment of the present document is a listen-before-talk frame structure, the solution provided by the embodiment of the present document is a solution of a listen-before-talk mechanism, and by using the frame structure and the corresponding method provided by the embodiment of the present document, unlicensed carrier resources can be efficiently obtained.

The resource obtaining method provided by the embodiment of the present document enables the LTE system to be more efficient in the contention for unlicensed carrier resources.

In addition, the resource obtaining method provided by the embodiment of the present document is also applicable to WIFI systems.

Embodiment 4

Figure 4:
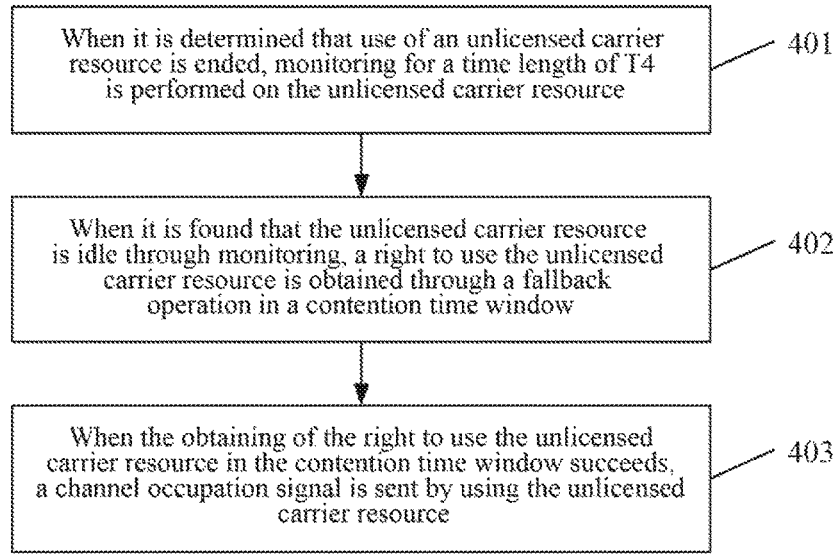
FIG. 4 illustrates a flowchart of a resource obtaining method according to embodiment 4 of the present document.

A resource obtaining method provided by the present embodiment, as illustrated in FIG. 4, includes the following steps.

In step 401, when it is determined that use of an unlicensed carrier resource is ended, monitoring for a time length of T4 is performed on the unlicensed carrier resource.

Specifically, a station which needs to obtain the unlicensed carrier resource learns about a use situation of the unlicensed carrier resource used by a station which uses the unlicensed carrier resource, and when the station which uses the unlicensed carrier resource ends the use of the unlicensed carrier resource, monitoring for a time length of T4 is performed on the unlicensed carrier resource.

Herein, the station which needs to obtain the unlicensed carrier resource may determine an end time point of the use of the unlicensed carrier resource used by the station which uses the unlicensed carrier resource according to received station time information which is sent by the station which uses the unlicensed carrier resource. A mode of monitoring the unlicensed carrier resource in real time may also be adopted, e.g., the station which needs to obtain the unlicensed carrier resource may monitor whether the unlicensed carrier resource is idle in real time, and if it is found that the unlicensed carrier resource is idle, the station which needs to obtain the unlicensed carrier resource determines that the station which uses the unlicensed carrier resource ends the use of the unlicensed carrier resource.

Herein, in actual application, when the station which needs to obtain the unlicensed carrier resource determines whether the station which uses the unlicensed carrier resource ends the use of the unlicensed carrier resource by adopting the mode of monitoring the unlicensed carrier resource in real time, this step may be specifically implemented through the following operations:

Whether the unlicensed carrier resource is idle is monitored in real time, and when it is found that the unlicensed carrier resource is idle, the station which needs to obtain the unlicensed carrier resource performs monitoring for a time length of T4 on the unlicensed carrier resource.

Monitoring for the time length of T4 performed on the unlicensed carrier resource specifically refers to that: the station which needs to obtain the unlicensed carrier resource always starts to perform monitoring for the time length of T4 from a start moment of a subframe. Here, the subframe refers to a subframe in which contention is performed.

In step 402, when it is found that the unlicensed carrier resource is idle through monitoring, a right to use the unlicensed carrier resource is obtained through a fallback operation in a contention time window.

Here, the operation of obtaining the right to use the unlicensed carrier resource through the fallback operation in the contention time window specifically includes the following operations:

the station which needs to obtain the unlicensed carrier resource determines a fallback moment (selects a random fallback value) in the designated contention time window, and monitors the unlicensed carrier resource in the contention time window before the determined fallback moment (the fallback value is progressively decreased to 0); and when the determined fallback moment is reached (the fallback value is progressively decreased to 0) and it is found that the unlicensed carrier resource is idle through monitoring in the contention time window, a channel occupation signal is started to be sent by using the unlicensed carrier resource at the determined fallback moment. At this moment, it indicates that the station which needs to obtain the unlicensed carrier resource successfully obtains the unlicensed carrier resource.

Herein, an OFDM symbol in the contention time window uses a short CP.

A time length of the contention time window does not exceed 1 ms and may be (1−T4) ms, herein T4 is a designated time length, and a value range of T4 is greater than or equal to 0 and is less than the time length of the contention time window. In actual application, a value of T4 may be determined according to time needed by a station to completely parse data once (i.e., the time spent by a station in processing a current data packet). Since difference in bandwidth may influence the time spent by the station in processing, different values may be defined aiming at different given bandwidths.

When the determined fallback moment is reached and it is found that the unlicensed carrier resource is idle through monitoring in the contention time window, it indicates that the station which needs to obtain the unlicensed carrier resource successfully obtains the unlicensed carrier resource; and when the determined fallback moment is reached and it is found that the unlicensed carrier resource is busy through monitoring, it indicates that the station which needs to obtain the unlicensed carrier resource fails to obtain the unlicensed carrier resource, and a subsequent operation is stopped.

Here, the situation that it is found that the unlicensed carrier resource is busy through monitoring refers to that: the station which needs to obtain the unlicensed carrier resource receives a signal in the unlicensed carrier resource and learns about that there is a signal sent by another station in the unlicensed carrier resource by parsing the signal; or receives a signal in the unlicensed carrier resource, and determines that energy of the unlicensed carrier resource exceeds a set energy threshold through energy detection.

Correspondingly, the situation that it is found that the unlicensed carrier resource is idle through monitoring refers to that: the station which needs to obtain the unlicensed carrier resource receives a signal in the unlicensed carrier resource and learns about that there is no signal sent by other stations in the unlicensed carrier resource by parsing the signal; or receives a signal in the unlicensed carrier resource, and determines that energy of the unlicensed carrier resource does not exceed a set energy threshold through energy detection.

The operation of determining the fallback moment in the designated contention time window is specifically:

dividing the contention time window into N parts and sequentially numbering as 0 to N−1; and randomly generating a numerical value M between 0 and N−1, herein a moment corresponding to M is the determined fallback moment.

Herein, the operation of randomly generating the numerical value M between 0 and N−1 includes randomly generating a numerical value between 0 and N−1 and then mapping to obtain the numerical value M between 0 and N−1.

Here, a time length of each part of the N parts may be a time length of one OFDM symbol, or half OFDM symbol or ¼ OFDM symbol.

When a situation that a single operator deploys the LTE system in unlicensed carriers at this geographical location is considered only, by selecting an interference situation between neighboring or distant cells according to characteristics of cellular cell deployment, the following modes of determining the time length of each part of the N parts may be given:

In one embodiment, the time length of each part does not exceed the contention time window/37 ms and may be (1−T4)/37 ms.

In one embodiment, the time length of each part does not exceed the contention time window/19 ms and may be (1−T4)/19 ms.

In one embodiment, the time length of each part does not exceed the contention time window/7 ms and may be (1−T4)/7 ms.

When a situation that multiple operators simultaneously deploy the LTE system in unlicensed carriers at this geographical location is considered, by selecting an interference situation between neighboring or distant cells according to characteristics of cellular cell deployment in consideration of the number of supported operators, e.g., two supported operators, the time length of each corresponding part is as follows:

In one embodiment, the time length of each part does not exceed the contention time window/(37*2) ms and may be (1−T4)/(37*2) ms.

In one embodiment, the time length of each part does not exceed the contention time window/(19*2) ms and may be (1−T4)/(19*2) ms.

In one embodiment, the time length of each part does not exceed the contention time window/(7*2) ms and may be (1−T4)/(7*2) ms.

In one embodiment, the time length of each part may be set according to system bandwidths of different unlicensed carrier resources. Specifically, the time length of each part is set to be K, and when the system bandwidth of the unlicensed carrier resource is 20M, the minimum value of K is 9 μs; when the system bandwidth of the unlicensed carrier resource is 10M, the minimum value of K is 13 μs; and when the system bandwidth of the unlicensed carrier resource is 5M, the minimum value of K is 21 μs.

The channel occupation signal may be at least one of the following: time information about occupation of the unlicensed carrier resource, a Beacon signal for channel occupation, a reference signal, etc. Here, the reference signal may be a reference signal for a synchronization purpose, etc.

In step 403, when the obtaining of the right to use the unlicensed carrier resource in the contention time window succeeds, a channel occupation signal is sent by using the unlicensed carrier resource.

The method may further include the following step:

When the station which needs to obtain the unlicensed carrier resource determines that the obtaining of the right to use the unlicensed carrier resource succeeds and until a next subframe starts, data are scheduled by using the obtained unlicensed carrier resource.

Here, a time start point that the station which needs to obtain the unlicensed carrier resource occupies the unlicensed carrier resource is a start point of the next subframe. In other words, the station which needs to obtain the unlicensed carrier signal sends a channel occupation signal by using the unlicensed carrier resource till a start moment of the next subframe.

When the station which needs to obtain the unlicensed carrier resource determines that the obtaining of the right to use the unlicensed carrier resource succeeds and until a next subframe starts, control signaling is sent by using the obtained unlicensed carrier resource to schedule UE data, or control signaling is sent by using a licensed carrier resource paired with the unlicensed carrier resource to schedule UE data to be transmitted in the unlicensed carrier resource.

Herein, only when it is determined that the obtaining of the right to use the unlicensed carrier resource succeeds and until a next subframe starts, the station which needs to obtain the unlicensed carrier resource is allowed to send control signaling by using the obtained unlicensed carrier resource to schedule UE data. This is because that the LTE system is a synchronized system, i.e., uniform subframes are needed to align a time start point. In other words, the scheduling of the LTE system is performed by taking subframe as a unit. Therefore, when the station which needs to obtain the unlicensed carrier resource successfully obtains the unlicensed carrier resource and a next subframe still does not come, the station which needs to obtain the unlicensed carrier resource cannot schedule UE data. However, the station which needs to obtain the unlicensed carrier resource may send some signals such as time information about occupation of the unlicensed carrier resource, beacon signals for channel occupation and various reference signals, etc. The effect of sending these signals is mainly to enable other systems (e.g., WIFI system) to monitor that the unlicensed carrier resource is busy, so as to prevent these systems from occupying the unlicensed carrier resource which has already been obtained by the station which needs to obtain the unlicensed carrier resource. If there is no other system at the station which needs to obtain the unlicensed carrier resource, e.g., there are only the LTE-U (which is called so when LTE operates on unlicensed carriers) systems, the station which needs to obtain the unlicensed carrier resource may not send a channel occupation signal within a period of time from a moment when the obtaining of the unlicensed carrier resource succeeds to a start moment of a next subframe. This is because that the following agreement may be made between the LTE-U systems: if other stations consider that the obtaining of resources fails, the other stations will not obtain the unlicensed resource on this frequency point any longer until the moment of the next subframe, but may receive a signal sent by the station which needs to obtain the unlicensed carrier resource (if the station which needs to obtain the unlicensed carrier resource sends the channel occupation signal).

The control signaling may be DCI; and the time information about the occupation of the unlicensed carrier resource may also be notified to other stations by using DCI. Necessary reference signals are also started to be sent from the next subframe.

The station described in the present embodiment may be a base station, etc., and generally refers to a device that uses unlicensed carriers.

According to the resource obtaining method provided by the embodiment of the present document, when it is determined that the use of the unlicensed carrier resource is ended, monitoring for the time length of T4 is performed on the unlicensed carrier resource; when it is found that the unlicensed carrier resource is idle through monitoring, the right to use the unlicensed carrier resource is obtained through the fallback operation in the contention time window; and when the time of the contention time window is ended and it is determined that the obtaining of the right to use the unlicensed carrier resource succeeds, the channel occupation signal is sent by using the unlicensed carrier resource till the start moment of the next subframe. The frame structure provided by the embodiment of the present document is a listen-before-talk frame structure, the solution provided by the embodiment of the present document is a solution of a listen-before-talk mechanism, and by using the frame structure and the corresponding method provided by the embodiment of the present document, unlicensed carrier resources can be efficiently obtained.

The resource obtaining method provided by the embodiment of the present document enables the LTE system to be more efficient in the contention for unlicensed carrier resources.

In addition, the resource obtaining method provided by the embodiment of the present document is also applicable to WIFI systems.

Embodiment 5

A resource obtaining method provided by the present embodiment includes the following step: when it is determined that use of an unlicensed carrier resource is ended, a right to use the unlicensed carrier resource is obtained directly through a fallback operation in a contention time window.

In other words, a station which needs to obtain the unlicensed carrier resource learns about a use situation of the unlicensed carrier resource used by a station which uses the unlicensed carrier resource, and when the station which uses the unlicensed carrier resource ends the use of the unlicensed carrier resource, a right to use the unlicensed carrier resource is obtained only through a fallback operation in a contention time window. Herein, the station which needs to obtain the unlicensed carrier resource may determine an end time point of the use of the unlicensed carrier resource used by the station which uses the unlicensed carrier resource according to received station time information which is sent by the station which uses the unlicensed carrier resource. A mode of monitoring the unlicensed carrier resource in real time may also be adopted, e.g., the station which needs to obtain the unlicensed carrier resource may monitor whether the unlicensed carrier resource is idle in real time, and if it is found that the unlicensed carrier resource is idle, the station which needs to obtain the unlicensed carrier resource determines that the station which uses the unlicensed carrier resource ends the use of the unlicensed carrier resource.

Herein, in actual application, when the station which needs to obtain the unlicensed carrier resource determines whether the station which uses the unlicensed carrier resource ends the use of the unlicensed carrier resource by adopting the mode of monitoring the unlicensed carrier resource in real time, this step of obtaining the right to use the unlicensed carrier resource directly through the fallback operation in the contention time window when it is determined that the use of the unlicensed carrier resource is ended may be specifically implemented through the following operations:

Whether the unlicensed carrier resource is idle is monitored in real time, and when it is found that the unlicensed carrier resource is idle, the station which needs to obtain the unlicensed carrier resource obtains the right to use the unlicensed carrier resource directly through the fallback operation in the contention time window.

In other words, the station which needs to obtain the unlicensed carrier resource performs monitoring for a time length of T5 on the unlicensed carrier resource; and when it is found that the unlicensed carrier resource is idle through monitoring, the right to use the unlicensed carrier resource is obtained directly through the fallback operation in the contention time window.

The operation of obtaining the right to use the unlicensed carrier resource through the fallback operation in the contention time window specifically includes the following operations:

the station which needs to obtain the unlicensed carrier resource determines a fallback moment (selects a random fallback value) in the designated contention time window, and monitors the unlicensed carrier resource in the contention time window before the determined fallback moment (the fallback value is progressively decreased to 0); and when the determined fallback moment is reached (the fallback value is progressively decreased to 0) and it is found that the unlicensed carrier resource is idle through monitoring in the contention time window, a channel occupation signal is started to be sent by using the unlicensed carrier resource at the determined fallback moment. At this moment, it indicates that the station which needs to obtain the unlicensed carrier resource successfully obtains the unlicensed carrier resource.

Herein, an OFDM symbol in the contention time window uses a short CP.

A time length of the contention time window does not exceed 1 ms and may be (1−T5) ms, herein T5 is a designated time length, and a value range of T5 is greater than or equal to 0 and is less than the time length of the contention time window. In actual application, a value of T5 may be determined according to the time needed by a station to completely parse data once (i.e., the time spent by a station in processing a current data packet). Since difference in bandwidth may influence the time spent by the station in processing, different values may be defined aiming at different given bandwidths.

When the determined fallback moment is reached and it is found that the unlicensed carrier resource is idle through monitoring in the contention time window, it indicates that the station which needs to obtain the unlicensed carrier resource successfully obtains the unlicensed carrier resource; and when the determined fallback moment is reached and it is found that the unlicensed carrier resource is busy through monitoring, it indicates that the station which needs to obtain the unlicensed carrier resource fails to obtain the unlicensed carrier resource, and a subsequent operation is stopped.

Here, the situation that it is found that the unlicensed carrier resource is busy through monitoring refers to that: the station which needs to obtain the unlicensed carrier resource receives a signal in the unlicensed carrier resource and learns about that there is a signal sent by another station in the unlicensed carrier resource by parsing the signal; or receives a signal in the unlicensed carrier resource, and determines that energy of the unlicensed carrier resource exceeds a set energy threshold through energy detection.

Correspondingly, the situation that it is found that the unlicensed carrier resource is idle through monitoring refers to that: the station which needs to obtain the unlicensed carrier resource receives a signal in the unlicensed carrier resource and learns about that there is no signal sent by other stations in the unlicensed carrier resource by parsing the signal; or receives a signal in the unlicensed carrier resource, and determines that energy of the unlicensed carrier resource does not exceed a set energy threshold through energy detection.

The operation of determining the fallback moment in the designated contention time window is specifically:

dividing the contention time window into N parts and sequentially numbering as 0 to N−1; and randomly generating a numerical value M between 0 and N−1, herein a moment corresponding to M is the determined fallback moment.

Herein, the operation of randomly generating the numerical value M between 0 and N−1 includes randomly generating a numerical value between 0 and N−1 and then mapping to obtain the numerical value M between 0 and N−1.

Here, a time length of each part of the N parts may be a time length of one OFDM symbol, or half OFDM symbol or ¼ OFDM symbol.

When a situation that a single operator deploys the LTE system in unlicensed carriers at this geographical location is considered only, by selecting an interference situation between neighboring or distant cells according to characteristics of cellular cell deployment, the following modes of determining the time length of each part of the N parts may be given:

In one embodiment, the time length of each part does not exceed the contention time window/37 ms and may be (1−T5)/37 ms.

In one embodiment, the time length of each part does not exceed the contention time window/19 ms and may be (1−T5)/19 ms.

In one embodiment, the time length of each part does not exceed the contention time window/7 ms and may be (1−T5)/7 ms.

When a situation that multiple operators simultaneously deploy the LTE system in unlicensed carriers at this geographical location is considered, by selecting an interference situation between neighboring or distant cells according to characteristics of cellular cell deployment in consideration of the number of supported operators, e.g., two supported operators, the time length of each corresponding part is as follows:

In one embodiment, the time length of each part does not exceed the contention time window/(37*2) ms and may be (1−T5)/(37*2) ms.

In one embodiment, the time length of each part does not exceed the contention time window/(19*2) ms and may be (1−T5)/(19*2) ms.

In one embodiment, the time length of each part does not exceed the contention time window/(7*2) ms and may be (1−T5)/(7*2) ms.

In one embodiment, the time length of each part may be set according to system bandwidths of different unlicensed carrier resources. Specifically, the time length of each part is set to be K, and when the system bandwidth of the unlicensed carrier resource is 20M, the minimum value of K is 9 μs; when the system bandwidth of the unlicensed carrier resource is 10M, the minimum value of K is 13 μs; and when the system bandwidth of the unlicensed carrier resource is 5M, the minimum value of K is 21 μs.

The channel occupation signal may be at least one of the following: time information about occupation of the unlicensed carrier resource, a Beacon signal for channel occupation, a reference signal, etc. Here, the reference signal may be a reference signal for a synchronization purpose, a reference signal for a measurement purpose, etc.

When it is determined that the obtaining of the right to use the unlicensed carrier resource succeeds and before a next subframe comes, the method may further include the following step:

A channel occupation signal is sent by using the unlicensed carrier resource till a start moment of the next subframe.

The method may further include the following step:

When it is determined that the obtaining of the right to use the unlicensed carrier resource succeeds and until a next subframe starts, data are scheduled by using the obtained unlicensed carrier resource.

Here, a time start point that the station which needs to obtain the unlicensed carrier resource occupies the unlicensed carrier resource is a start point of the next subframe.

When the station which needs to obtain the unlicensed carrier resource determines that the obtaining of the right to use the unlicensed carrier resource succeeds and until a next subframe starts, control signaling is sent by using the obtained unlicensed carrier resource to schedule UE data, or control signaling is sent by using a licensed carrier resource paired with the unlicensed carrier resource to schedule UE data to be transmitted in the unlicensed carrier resource.

Herein, only when it is determined that the obtaining of the right to use the unlicensed carrier resource succeeds and until a next subframe starts, the station which needs to obtain the unlicensed carrier resource is allowed to send control signaling by using the obtained unlicensed carrier resource to schedule UE data. This is because that the LTE system is a synchronized system, i.e., uniform subframes are needed to align a time start point. In other words, the scheduling of the LTE system is performed by taking subframe as a unit.

Therefore, when the station which needs to obtain the unlicensed carrier resource successfully obtains the unlicensed carrier resource and a next subframe still does not come, the station which needs to obtain the unlicensed carrier resource cannot schedule UE data. However, the station which needs to obtain the unlicensed carrier resource may send some signals such as time information about occupation of the unlicensed carrier resource, beacon signals for channel occupation and various reference signals, etc. The effect of sending these signals is mainly to enable other systems (e.g., WIFI system) to monitor that the unlicensed carrier resource is busy, so as to prevent these systems from occupying the unlicensed carrier resource which has already been obtained by the station which needs to obtain the unlicensed carrier resource. If there is no other system at the station which needs to obtain the unlicensed carrier resource, e.g., there are only the LTE-U (which is called so when LTE operates on unlicensed carriers) systems, the station which needs to obtain the unlicensed carrier resource may not send a channel occupation signal within a period of time from a moment when the obtaining of the unlicensed carrier resource succeeds to a start moment of a next subframe. This is because that the following agreement may be made between the LTE-U systems: if other stations consider that the obtaining of resources fails, the other stations will not obtain the unlicensed resource on this frequency point any longer until the moment of the next subframe, but may receive a signal sent by the station which needs to obtain the unlicensed carrier resource (if the station which needs to obtain the unlicensed carrier resource sends the channel occupation signal).

The control signaling may be DCI; and the time information about the occupation of the unlicensed carrier resource may also be notified to other stations by using DCI. Necessary reference signals are also started to be sent from the next subframe.

The station described in the present embodiment may be a base station, etc., and generally refers to a device that uses unlicensed carriers.

According to the resource obtaining method provided by the embodiment of the present document, when it is determined that the use of the unlicensed carrier resource is ended, the right to use the unlicensed carrier resource is obtained directly through the fallback operation in the contention time window. The frame structure provided by the embodiment of the present document is a listen-before-talk frame structure, the solution provided by the embodiment of the present document is a solution of a listen-before-talk mechanism, and by using the frame structure and the corresponding method provided by the embodiment of the present document, unlicensed carrier resources can be efficiently obtained.

The resource obtaining method provided by the embodiment of the present document enables the LTE system to be more efficient in the contention for unlicensed carrier resources.

In addition, the resource obtaining method provided by the embodiment of the present document is also applicable to WIFI systems.

Embodiment 6

Figure 5:
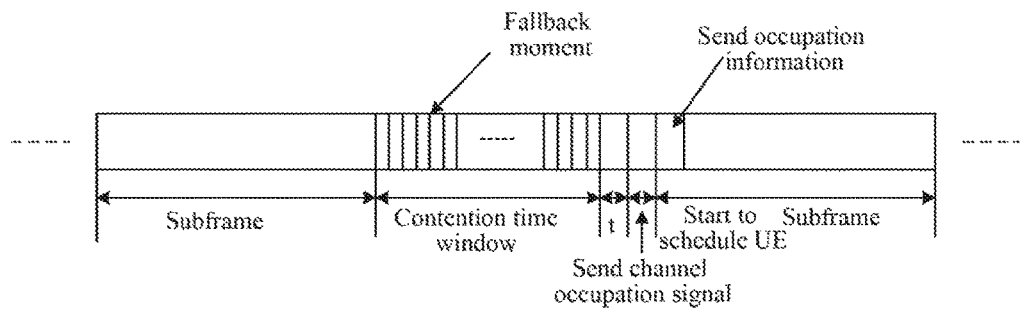
FIG. 5 illustrates a schematic diagram of a frame structure according to embodiment 6 of the present document.

FIG. 5 illustrates a schematic diagram of a frame structure adopted by the present embodiment. As illustrated in FIG. 5, a time length occupied by the entire listen-before-talk mechanism is a time length of one LTE subframe. In actual application, the occupied time length may also be a time length of multiple subframes and may also be a time length of non-integral subframes.

With reference to FIG. 5, the specific implementation of the listen-before-talk mechanism in the present embodiment includes the following operations:

Base station 1 (which represents a type of stations and may also be a UE participating in contention) monitors other stations which are using an unlicensed carrier resource, is synchronized with the other stations which are using the unlicensed carrier resource to receive time information about occupation of the unlicensed carrier resource sent by the other stations which are using the unlicensed carrier resource, and finally obtains a start moment of a contention time window.

When the other stations end the use of the unlicensed carrier resource, base station 1 starts to perform contention for the unlicensed carrier resource by using the contention time window. Specifically, base station 1 randomly generates a numerical value to determine a fallback moment in the contention time window, base station 1 monitors the unlicensed carrier resource before the determined fallback moment, when the determined fallback moment is reached, if a monitoring result is that the unlicensed carrier resource is idle, base station 1 considers that base station 1 successfully obtains the unlicensed carrier resource, base station 1 starts to send a signal (which at this moment may be a reference signal, a synchronization signal or a channel occupation signal) from the determined fallback moment, and other stations which participate in obtaining the unlicensed carrier resource will monitor that the unlicensed carrier resource is busy in a process of monitoring the unlicensed carrier resource before the respective fallback moment and thus learn about that the unlicensed carrier resource has already been occupied. Here, if base station 1 monitors that the unlicensed carrier resource is busy before the determined fallback moment, base station 1 considers that the contention for the unlicensed carrier resource at this time fails and stops a subsequent operation.

After the time of the contention time window is ended, base station 1 performs monitoring for a time length of t, at this moment, monitoring is mainly used for finding whether the unlicensed carrier resource is used by a main system such as a military radar system, and if the unlicensed carrier resource is used by the main system, base station 1 needs to give up the use of the unlicensed carrier resource. Herein, after monitoring for the period of time t is ended, a start moment of a next subframe still does not come, and thus base station 1 continues to sends a channel occupation signal to prevent the unlicensed carrier resource from being occupied by other systems.

Base station 1 sends occupation information in the next subframe and starts to schedule UE data.

Embodiment 7

Figure 6:
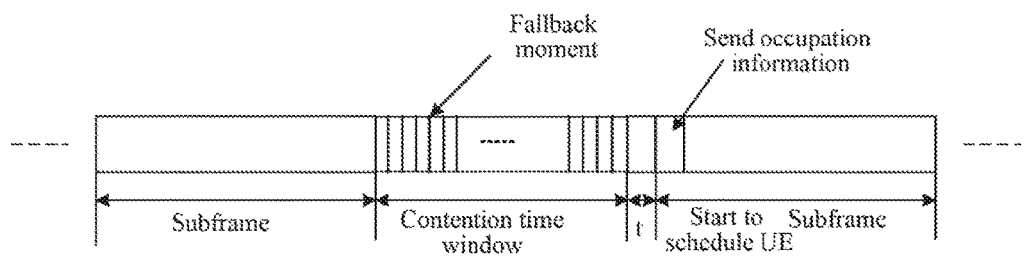
FIG. 6 illustrates a schematic diagram of a frame structure according to embodiment 7 of the present document.

FIG. 6 illustrates a schematic diagram of a frame structure adopted by the present embodiment. As illustrated in FIG. 6, a time length occupied by the entire listen-before-talk mechanism is a time length of one LTE subframe. In actual application, the occupied time length may also be a time length of multiple subframes and may also be a time length of non-integral subframes.

With reference to FIG. 6, the specific implementation of the listen-before-talk mechanism in the present embodiment includes the following operations:

Base station 1 (which represents a type of stations and may also be a UE participating in contention) monitors other stations which are using an unlicensed carrier resource, is synchronized with the other stations which are using the unlicensed carrier resource to receive time information about occupation of the unlicensed carrier resource sent by the other stations which are using the unlicensed carrier resource, and finally obtains a start moment of a contention time window.

When the other stations end the use of the unlicensed carrier resource, base station 1 starts to perform contention for the unlicensed carrier resource by using the contention time window. Specifically, base station 1 randomly generates a numerical value to determine a fallback moment in the contention time window, base station 1 monitors the unlicensed carrier resource before the determined fallback moment, when the determined fallback moment is reached, if a monitoring result is that the unlicensed carrier resource is idle, base station 1 considers that base station 1 successfully obtains the unlicensed carrier resource, base station 1 starts to send a signal (which at this moment may be a reference signal, a synchronization signal or a channel occupation signal) from the determined fallback moment, and other stations which participate in obtaining the unlicensed carrier resource will monitor that the unlicensed carrier resource is busy in a process of monitoring the unlicensed carrier resource before the respective fallback moment and thus learn about that the unlicensed carrier resource has already been occupied. Here, if base station 1 monitors that the unlicensed carrier resource is busy before the determined fallback moment, base station 1 considers that the contention for the unlicensed carrier resource at this time fails and stops a subsequent operation.

After the time of the contention time window is ended, base station 1 performs monitoring for a time length of t, at this moment, monitoring is mainly used for finding whether the unlicensed carrier resource is used by a main system such as a military radar system, and if the unlicensed carrier resource is used by the main system, base station 1 needs to give up the use of the unlicensed carrier resource. At this moment, an end moment of the time length t is a start moment of a next subframe.

Base station 1 sends occupation information in the next subframe and starts to schedule UE data.

Embodiment 8

Figure 7:
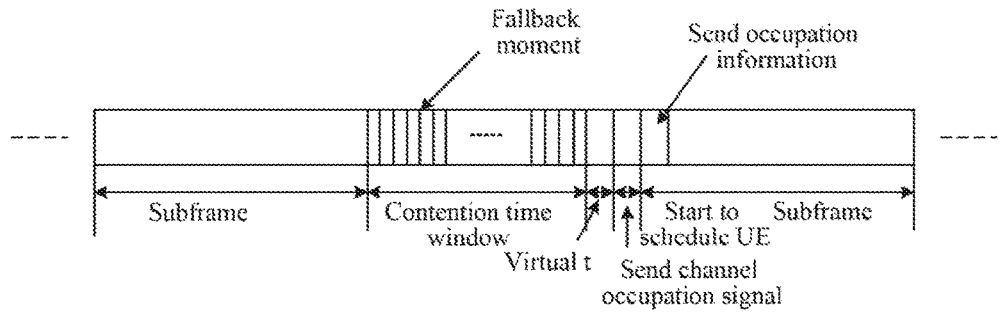
FIG. 7 illustrates a schematic diagram of a frame structure according to embodiment 8 of the present document.

FIG. 7 illustrates a schematic diagram of a frame structure adopted by the present embodiment. As illustrated in FIG. 7, a time length occupied by the entire listen-before-talk mechanism is a time length of one LTE subframe. In actual application, the occupied time length may also be a time length of multiple subframes and may also be a time length of non-integral subframes.

With reference to FIG. 7, the specific implementation of the listen-before-talk mechanism in the present embodiment includes the following operations:

Base station 1 (which represents a type of stations and may also be a UE participating in contention) monitors other stations which are using an unlicensed carrier resource, is synchronized with the other stations which are using the unlicensed carrier resource to receive time information about occupation of the unlicensed carrier resource sent by the other stations which are using the unlicensed carrier resource, and finally obtains a start moment of a contention time window.

When the other stations end the use of the unlicensed carrier resource, base station 1 starts to perform contention for the unlicensed carrier resource by using the contention time window. Specifically, base station 1 randomly generates a numerical value to determine a fallback moment in the contention time window, base station 1 monitors the unlicensed carrier resource before the determined fallback moment, when the determined fallback moment is reached, if a monitoring result is that the unlicensed carrier resource is idle, base station 1 considers that base station 1 successfully obtains the unlicensed carrier resource, base station 1 starts to send a signal (which at this moment may be a reference signal, a synchronization signal or a channel occupation signal) from the determined fallback moment, and other stations which participate in obtaining the unlicensed carrier resource will monitor that the unlicensed carrier resource is busy in a process of monitoring the unlicensed carrier resource before the respective fallback moment and thus learn about that the unlicensed carrier resource has already been occupied. Here, if base station 1 monitors that the unlicensed carrier resource is busy before the determined fallback moment, base station 1 considers that the contention for the unlicensed carrier resource at this time fails and stops a subsequent operation.

After the time of the contention time window is ended, base station 1 judges whether a time interval between the determined fallback moment and a previous subframe (a time interval between the fallback moment and a use end moment of the unlicensed carrier resource) is greater than or equal to t, and when it is determined that the time interval between the determined fallback moment and the previous subframe is greater than or equal to t, base station 1 does not perform monitoring for a time length of t but starts to send a signal after the end of the contention time window till a start moment of a next subframe; and at this moment, monitoring performed in the contention time window may be considered as effective. Here, the sent signal may be data for channel occupation or other purposes. When it is determined that the time interval between the determined fallback moment and the previous subframe is less than t, base station 1 performs monitoring for a time length of t, at this moment, monitoring is mainly used for finding whether the unlicensed carrier resource is used by a main system such as a military radar system, and if the unlicensed carrier resource is used by the main system, base station 1 needs to give up the use of the unlicensed carrier resource. After the period of time t is ended, a start moment of a next subframe still does not come, and thus base station 1 continues to send a channel occupation signal to prevent the unlicensed carrier resource from being occupied by other systems.

Base station 1 sends occupation information in the next subframe and starts to schedule UE data.

Embodiment 9

Figure 8:
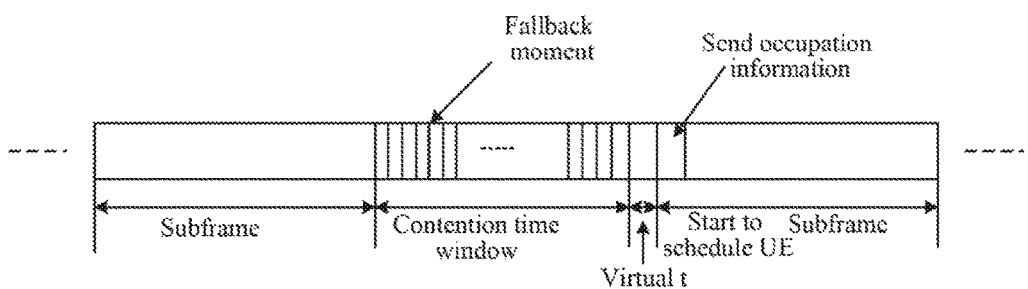
FIG. 8 illustrates a schematic diagram of a frame structure according to embodiment 9 of the present document.

FIG. 8 illustrates a schematic diagram of a frame structure adopted by the present embodiment. As illustrated in FIG. 8, a time length occupied by the entire listen-before-talk mechanism is a time length of one LTE subframe. In actual application, the occupied time length may also be a time length of multiple subframes and may also be a time length of non-integral subframes.

With reference to FIG. 8, the specific implementation of the listen-before-talk mechanism in the present embodiment includes the following operations:

Base station 1 (which represents a type of stations and may also be a UE participating in contention) monitors other stations which are using an unlicensed carrier resource, is synchronized with the other stations which are using the unlicensed carrier resource to receive time information about occupation of the unlicensed carrier resource sent by the other stations which are using the unlicensed carrier resource, and finally obtains a start moment of a contention time window.

When the other stations end the use of the unlicensed carrier resource, base station 1 starts to perform contention for the unlicensed carrier resource by using the contention time window. Specifically, base station 1 randomly generates a numerical value to determine a fallback moment in the contention time window, base station 1 monitors the unlicensed carrier resource before the determined fallback moment, when the determined fallback moment is reached, if a monitoring result is that the unlicensed carrier resource is idle, base station 1 considers that base station 1 successfully obtains the unlicensed carrier resource, base station 1 starts to send a signal (which at this moment may be a reference signal, a synchronization signal or a channel occupation signal) from the determined fallback moment, and other stations which participate in obtaining the unlicensed carrier resource will monitor that the unlicensed carrier resource is busy in a process of monitoring the unlicensed carrier resource before the respective fallback moment and thus learn about that the unlicensed carrier resource has already been occupied. Here, if base station 1 monitors that the unlicensed carrier resource is busy before the determined fallback moment, base station 1 considers that the contention for the unlicensed carrier resource at this time fails and stops a subsequent operation.

After the time of the contention time window is ended, base station 1 judges whether a time interval between the determined fallback moment and a previous subframe (a time interval between the fallback moment and a use end moment of the unlicensed carrier resource) is greater than or equal to t, and when it is determined that the time interval between the determined fallback moment and the previous subframe is greater than or equal to t, base station 1 does not perform monitoring for a time length of t, and at this moment, monitoring performed in the contention time window may be considered as effective. Here, the sent signal may be data for channel occupation or other purposes. When it is determined that the time interval between the determined fallback moment and the previous subframe is less than t, base station 1 performs monitoring for a time length of t, at this moment, monitoring is mainly used for finding whether the unlicensed carrier resource is used by a main system such as a military radar system, etc, and if the unlicensed carrier resource is used by the main system, base station 1 needs to give up the use of the unlicensed carrier resource. After the period of time t is ended, a start moment of a next subframe comes.

Base station 1 sends occupation information in the next subframe and starts to schedule UE data.

From the description above, it can be seen that the frame structure in embodiment 5 is obtained based on the frame structure in embodiment 4 by removing the part "send channel occupation signal" illustrated in embodiment 4, and the time of this part may be used in the design of the contention time window, such that the contention time window becomes longer and thereby the probability of conflict between base stations is reduced.

Embodiment 10

Figure 9:
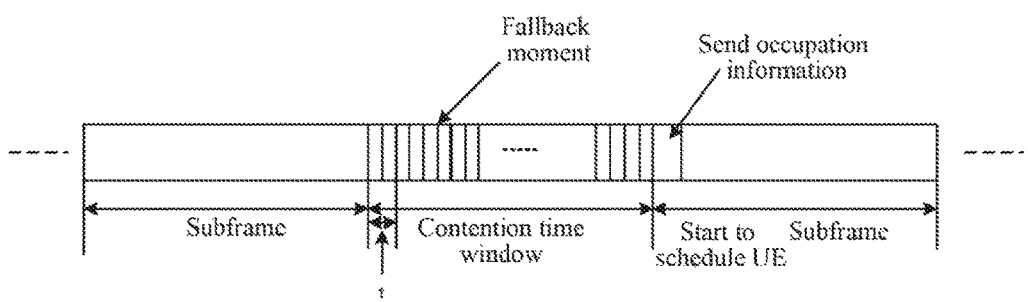
FIG. 9 illustrates a schematic diagram of a frame structure according to embodiment 10 of the present document.

FIG. 9 illustrates a schematic diagram of a frame structure adopted by the present embodiment. As illustrated in FIG. 9, a time length occupied by the entire listen-before-talk mechanism is a time length of one LTE subframe. In actual application, the occupied time length may also be a time length of multiple subframes and may also be a time length of non-integral subframes.

With reference to FIG. 9, the specific implementation of the listen-before-talk mechanism in the present embodiment includes the following operations:

Base station 1 (which represents a type of stations and may also be a UE participating in contention) monitors other stations which are using an unlicensed carrier resource, is synchronized with the other stations which are using the unlicensed carrier resource to receive time information about occupation of the unlicensed carrier resource sent by the other stations which are using the unlicensed carrier resource, and finally obtains a start moment of a contention time window.

When the other stations end the use of the unlicensed carrier resource, base station 1 starts to perform contention for the unlicensed carrier resource by using the contention time window. Specifically, base station 1 randomly generates a numerical value to determine a fallback moment in the contention time window, when a time interval between the determined fallback moment and the use end moment of the unlicensed carrier resource is greater than or equal to t, base station 1 monitors the unlicensed carrier resource before the determined fallback moment, when the determined fallback moment is reached, if a monitoring result is that the unlicensed carrier resource is idle, base station 1 considers that base station 1 successfully obtains the unlicensed carrier resource, base station 1 starts to send a signal (which at this moment may be a reference signal, a synchronization signal or a channel occupation signal) from the determined fallback moment till a start moment of a next subframe, and other stations which participate in obtaining the unlicensed carrier resource will monitor that the unlicensed carrier resource is busy in a process of monitoring the unlicensed carrier resource before the respective fallback moment and thus learn about that the unlicensed carrier resource has already been occupied. Here, if base station 1 monitors that the unlicensed carrier resource is busy before the determined fallback moment, base station 1 considers that the contention for the unlicensed carrier resource at this time fails and stops a subsequent operation.

Base station 1 sends occupation information in the next subframe and starts to schedule UE data.

When the time interval between the determined fallback moment and the use end moment of the unlicensed carrier resource is less than t, base station 1 may perform the following operations:

1. Base station 1 considers that the contention for the unlicensed carrier resource at this time fails, and base station 1 is set such that the probability that base station 1 successfully obtains the unlicensed carrier resource at a next time is greatly improved. For example, the contention time window of base station 1 at a next time of contention may be set to be relatively small (but greater than time t), and the fallback moment selected by base station 1 may be set to be just after moment t.

2. Base station 1 adjusts the selected fallback moment to be a first moment after moment t.

Herein, if processing is performed according to the first mode, base station 1 stops performing the contention for the unlicensed carrier resource at this time. If processing is performed according to the second mode, at this moment, the time interval between the adjusted fallback moment and the start moment of the contention time window is greater than or equal to t and thus base station 1 performs operations according to the foresaid corresponding mode.

From the description above, it can be seen that the frame structure in embodiment 6 is obtained based on the frame structure in embodiment 5 by removing the part "virtual t" illustrated in embodiment 5, and the time of this part may be used in the design of the contention time window, such that the contention time window becomes longer and thereby the probability of conflict between base stations is reduced.

Embodiment 11

Figure 10:
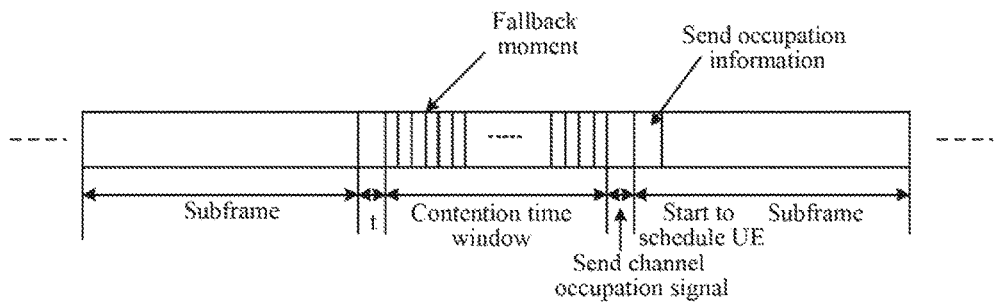
FIG. 10 illustrates a schematic diagram of a frame structure according to embodiment 11 of the present document.

FIG. 10 illustrates a schematic diagram of a frame structure adopted by the present embodiment. As illustrated in FIG. 10, a time length occupied by the entire listen-before-talk mechanism is a time length of one LTE subframe. In actual application, the occupied time length may also be a time length of multiple subframes and may also be a time length of non-integral subframes.

With reference to FIG. 10, the specific implementation of the listen-before-talk mechanism in the present embodiment includes the following operations:

Base station 1 (which represents a type of stations and may also be a UE participating in contention) monitors other stations which are using an unlicensed carrier resource, is synchronized with the other stations which are using the unlicensed carrier resource to receive time information about occupation of the unlicensed carrier resource sent by the other stations which are using the unlicensed carrier resource, and finally obtains a start moment of a contention time window. Base station 1 may also monitor whether the unlicensed carrier resource is idle in real time, and when it is found that the unlicensed carrier resource is idle and the idle state lasts for a certain time length (e.g., time length t illustrated in FIG. 10), base station 1 obtains a right to use the unlicensed carrier resource through a fallback operation in the contention time window. Alternatively, base station 1 starts to perform monitoring for a time length of t from a start moment of a subframe, and when it is monitored that the unlicensed carrier resource is idle, base station 1 enters a contention window fallback process. The length of the contention window may be less than or greater than a time length of one subframe (1 ms).

When the other stations end the use of the unlicensed carrier resource, base station 1 starts to perform monitoring for a time length of t, if it is monitored that the unlicensed carrier resource is busy in a period of monitoring for the time length of t, base station 1 considers that the unlicensed carrier resource has already been used by other stations and base station 1 stops performing the contention for the unlicensed carrier resource; and if it is monitored that the unlicensed carrier resource is idle in the period of monitoring for the time length of t, base station 1 performs contention for the unlicensed carrier resource by using the contention time window. Specifically, base station 1 randomly generates a numerical value to determine a fallback moment in the contention time window, base station 1 monitors the unlicensed carrier resource before the determined fallback moment, when the determined fallback moment is reached, if a monitoring result is that the unlicensed carrier resource is idle (if the monitoring result is that the unlicensed carrier resource is busy, base station 1 considers that the contention for the unlicensed carrier resource at this time fails and stops a subsequent operation), base station 1 considers that base station 1 successfully obtains the unlicensed carrier resource, base station 1 starts to send a signal (which at this moment may be a reference signal, a synchronization signal or a channel occupation signal) from the determined fallback moment until the contention time window is ended, and after the contention time window is ended, a start moment of a next subframe still does not come, base station 1 continues to send a channel occupation signal or sends some predetermined signals to help UE to learn about relevant information of the unlicensed carrier resource (e.g., configuration information of a reference signal which will be sent by base station 1 in a next subframe) to prevent the unlicensed carrier resource from being occupied by other systems.

Base station 1 sends occupation information until the next subframe and starts to schedule UE data.

In the present embodiment, a period of time of "send channel occupation signal" is reserved for a main purpose of enabling the station which successfully obtains the unlicensed carrier resource to send some control information in this period of time or activating configuration information, etc, so as to help the UE to learn about that base station 1 successfully obtains the unlicensed carrier resource through contention, and help the UE to learn about configuration information which will be used by base station 1 in a next subframe, e.g., configuration information of the sent reference signal, and other predetermined information. Here, the other predetermined information, for example, includes information about agreement on activating the unlicensed carrier resource for RRC (Radio Resource Control) state UE supporting the unlicensed carrier resource in a next subframe.

The above-mentioned information of "send channel occupation signal" may also be started to be sent by base station 1 from the determined fallback moment. This is also similar in other embodiments from embodiment 6 to embodiment 14. When base station 1 has already learned about that the systems nearby are all LTE-U systems during deployment, this type of information may not be sent because that other stations know that base station 1 successfully obtains the unlicensed carrier resource in the LTE-U systems. However, if there are WIFI systems near base station 1, since the WIFI systems cannot parse the LTE-U contention mechanism, the channel occupation signal must be sent.

Embodiment 12

Figure 11:
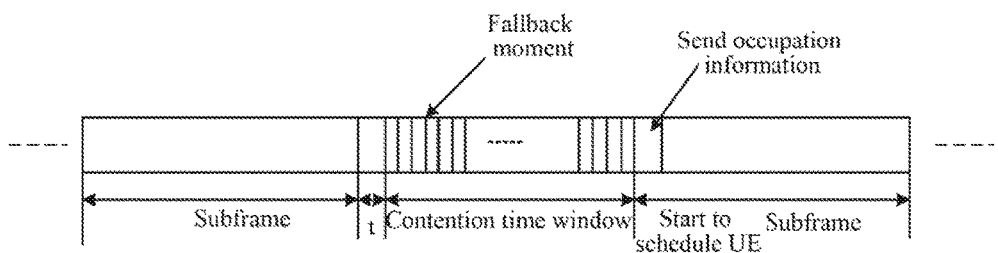
FIG. 11 illustrates a schematic diagram of a frame structure according to embodiment 12 of the present document.

FIG. 11 illustrates a schematic diagram of a frame structure adopted by the present embodiment. As illustrated in FIG. 11, a time length occupied by the entire listen-before-talk mechanism is a time length of one LTE subframe. In actual application, the occupied time length may also be a time length of multiple subframes and may also be a time length of non-integral subframes.

With reference to FIG. 11, the specific implementation of the listen-before-talk mechanism in the present embodiment includes the following operations:

Base station 1 (which represents a type of stations and may also be a UE participating in contention) monitors other stations which are using an unlicensed carrier resource, is synchronized with the other stations which are using the unlicensed carrier resource to receive time information about occupation of the unlicensed carrier resource sent by the other stations which are using the unlicensed carrier resource, and finally obtains a start moment of a contention time window.

When the other stations end the use of the unlicensed carrier resource, base station 1 starts to perform monitoring for a time length of t, if it is monitored that the unlicensed carrier resource is busy in a period of monitoring for the time length of t, base station 1 considers that the unlicensed carrier resource has already been used by other stations and base station 1 stops performing the contention for the unlicensed carrier resource; and if it is monitored that the unlicensed carrier resource is idle in the period of monitoring for the time length of t, base station 1 performs contention for the unlicensed carrier resource by using the contention time window. Specifically, base station 1 randomly generates a numerical value to determine a fallback moment in the contention time window, base station 1 monitors the unlicensed carrier resource before the determined fallback moment, when the determined fallback moment is reached, if a monitoring result is that the unlicensed carrier resource is idle (if the monitoring result is that the unlicensed carrier resource is busy, base station 1 considers that the contention for the unlicensed carrier resource at this time fails and stops a subsequent operation), base station 1 considers that base station 1 successfully obtains the unlicensed carrier resource, and base station 1 starts to send a signal (which at this moment may be a reference signal, a synchronization signal or a channel occupation signal) from the determined fallback moment until the contention time window is ended. Herein, the sent signal is a channel occupation signal or some predetermined signals which help the UE to learn about relevant information of the unlicensed carrier resource (e.g., configuration information of a reference signal which will be sent by base station 1 in a next subframe) to prevent the unlicensed carrier resource from being occupied by other systems.

Base station 1 sends occupation information until in the next subframe and starts to schedule UE data.

Embodiment 13

Figure 12:
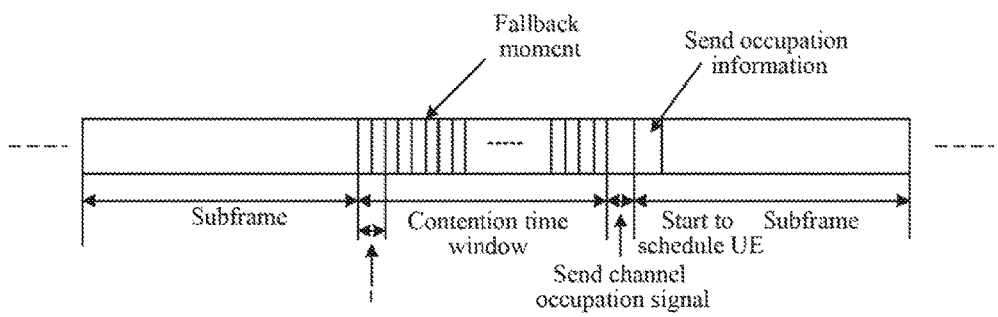
FIG. 12 illustrates a schematic diagram of a frame structure according to embodiment 13 of the present document.

FIG. 12 illustrates a schematic diagram of a frame structure adopted by the present embodiment. As illustrated in FIG. 12, in the present embodiment, a time length occupied by the entire listen-before-talk mechanism is a time length of one LTE subframe. In actual application, the occupied time length may also be a time length of multiple subframes and may also be a time length of non-integral subframes.

With reference to FIG. 12, the specific implementation of the listen-before-talk mechanism in the present embodiment includes the following operations:

Base station 1 (which represents a type of stations and may also be a UE participating in contention) monitors other stations which are using an unlicensed carrier resource, is synchronized with the other stations which are using the unlicensed carrier resource to receive time information about occupation of the unlicensed carrier resource sent by the other stations which are using the unlicensed carrier resource, and finally obtains a start moment of a contention time window.

When the other stations end the use of the unlicensed carrier resource, base station 1 starts to perform contention for the unlicensed carrier resource by using the contention time window. Specifically, base station 1 randomly generates a numerical value to determine a fallback moment in the contention time window; then, base station 1 makes a judgment, when a time interval between the determined fallback moment and a previous subframe (a time interval between the fallback moment and a use end moment of the unlicensed carrier resource) is greater than or equal to t, base station 1 monitors the unlicensed carrier resource before the determined fallback moment, when the determined fallback moment is reached, if a monitoring result is that the unlicensed carrier resource is idle (if the monitoring result is that the unlicensed carrier resource is busy, base station 1 considers that the contention for the unlicensed carrier resource at this time fails and stops a subsequent operation), base station 1 considers that base station 1 successfully obtains the unlicensed carrier resource, base station 1 starts to send a signal (which at this moment may be a reference signal, a synchronization signal or a channel occupation signal) from the determined fallback moment until the contention time window is ended; and then base station 1 continues to send a signal in the period of "send channel occupation signal" till a start moment of a next subframe, and other stations which participate in obtaining the unlicensed carrier resource will monitor that the unlicensed carrier resource is busy in a process of monitoring the unlicensed carrier resource before the respective fallback moment and thus learn about that the unlicensed carrier resource has already been occupied.

When the time interval between the determined fallback moment and the previous subframe is less than t, base station 1 may perform the following operations:

1. Base station 1 considers that the contention for the unlicensed carrier resource at this time fails, and base station 1 is set such that the probability that base station 1 successfully obtains the unlicensed carrier resource at a next time is greatly improved. For example, the contention time window of base station 1 at a next time of contention may be set to be relatively small (but greater than t), and the fallback moment selected by base station 1 may be set to be just after moment t.

2. Base station 1 adjusts the selected fallback moment to be a first moment after moment t.

Herein, if processing is performed according to the first mode, base station 1 stops performing the contention for the unlicensed carrier resource at this time. If processing is performed according to the second mode, at this moment, the time interval between the adjusted fallback moment and the start moment of the contention time window is greater than or equal to t and thus base station 1 performs operations according to the foresaid corresponding mode.

Base station 1 can start to schedule UE data only in the next subframe.

Embodiment 14

Figure 13:
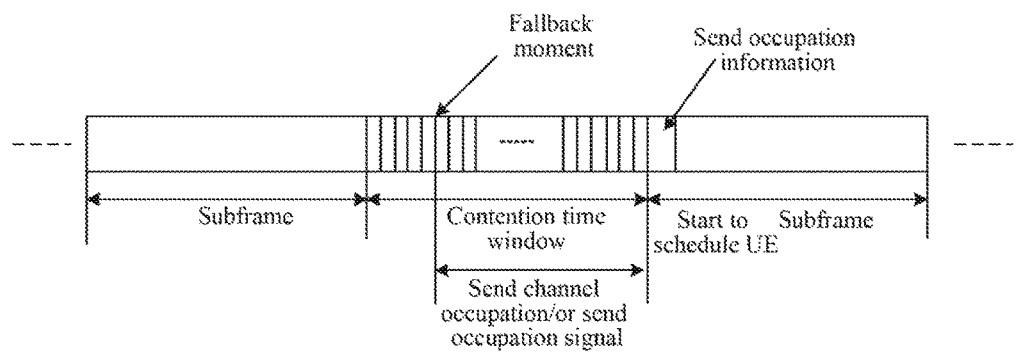
FIG. 13 illustrates a schematic diagram of a frame structure according to embodiment 14 of the present document.

FIG. 13 illustrates a schematic diagram of a frame structure adopted by the present embodiment. As illustrated in FIG. 13, a time length occupied by the entire listen-before-talk mechanism is a time length of one LTE subframe. In actual application, the occupied time length may also be a time length of multiple subframes and may also be a time length of non-integral subframes. Base station 1 may also monitor whether the unlicensed carrier resource is idle in real time, and when it is found that the unlicensed carrier resource is idle and the idle state lasts for a certain time length (e.g., time length t illustrated in FIG. 10), base station 1 obtains a right to use the unlicensed carrier resource through a fallback operation in the contention time window. Alternatively, base station 1 starts to perform monitoring for a time length of t as illustrated in FIG. 10 from a start moment of a subframe, and when it is monitored that the unlicensed carrier resource is idle, base station 1 enters a contention window fallback process. The length of the contention window may be less than or greater than a time length of one subframe (1 ms). When the contention fallback moment is reached (i.e., the fallback value randomly generated by base station 1 is progressively decreased to 0), if the contention succeeds, base station 1 can sent a channel occupation signal.

With reference to FIG. 13, the specific implementation of the listen-before-talk mechanism in the present embodiment includes the following operations:

Base station 1 (which represents a type of stations and may also be a UE participating in contention) monitors other stations which are using an unlicensed carrier resource, is synchronized with the other stations which are using the unlicensed carrier resource to receive time information about occupation of the unlicensed carrier resource sent by the other stations which are using the unlicensed carrier resource, and finally obtains a start moment of a contention time window.

When the other stations end the use of the unlicensed carrier resource, base station 1 starts to perform contention for the unlicensed carrier resource by using the content time window. Specifically, base station 1 randomly generates a numerical value to determine a fallback moment in the contention time window, base station 1 monitors the unlicensed carrier resource before the determined fallback moment, and when the determined fallback moment is reached, if a monitoring result is that the unlicensed carrier resource is idle (if the monitoring result is that the unlicensed carrier resource is busy, base station 1 considers that the contention for the unlicensed carrier resource at this time fails and stops a subsequent operation), base station 1 considers that base station 1 successfully obtains the unlicensed carrier resource. Alternatively, after the obtaining succeeds, base station 1 starts to send a signal from the determined fallback moment till a start moment of a next subframe. Herein, the sent signal is a channel occupation signal or some predetermined signals which help UE to learn about relevant information of the unlicensed carrier resource (e.g., configuration information of a reference signal which will be sent by base station 1 in a next subframe) to prevent the unlicensed carrier resource from being occupied by other systems.

In the present embodiment, monitoring for the time length of t performed by base station 1 is omitted because what participate in the contention for the unlicensed carrier resource in LTE systems are base stations, and direct sending of air interface data is almost not performed between the base stations, time-frequency resources for sending also need to be agreed in advance even though data are occasionally sent, so as to prevent the following situations from occurring:

After the other stations end the use of the unlicensed carrier resource, base station 1 successfully obtains the unlicensed carrier resource in the shortest time (e.g., during this time, a device cannot make a preparation for a process from uplink sending to downlink receiving), and at this moment, base station 1 will not immediately send data to the other base stations by using the obtained unlicensed carrier resource but can use the unlicensed carrier resource only when a next subframe arrives, such that the problem that the other base stations cannot receive data or the problem that the signal receiving quality is poor due to a reason that the other base stations are not successfully switched from a downlink sending state to an uplink receiving state. Besides the process of the monitoring for the time length t may be used for monitoring and finding the main system, it may also provide time for the other base stations to switch from uplink to downlink. If the matter of the main system is not considered, obviously, in combination with the mechanism of the LTE system, the process that base station 1 performs monitoring for the time length of t after the other stations end the use of the unlicensed carrier resource may also be omitted. The monitoring is designed for a main purpose that base station 1 has enough protection time from the moment when the unlicensed carrier resource is successfully obtained to the moment when the unlicensed carrier resource is used, e.g., data are not sent until a next subframe comes; or before the resource is successfully obtained, the LTE system has already had enough protection time (e.g., a fallback moment of obtaining fallback is comparatively great and it is ok generally as long as the fallback moment is not the first fallback moment).

Figure 14:
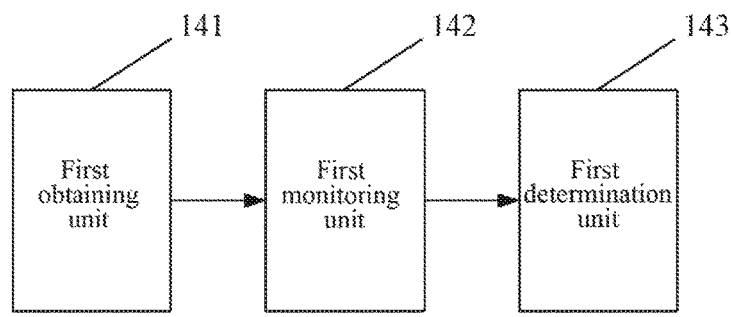
FIG. 14 illustrates a structural schematic diagram of a first station according to the embodiment of the present document.

In order to implement the method provided by embodiment 1, the embodiment of the present document further provides a station. As illustrated in FIG. 14, the station includes: a first obtaining unit 141, a first monitoring unit 142 and a first determination unit 143, herein, the first obtaining unit 141 is arranged to, when it is determined that the use of an unlicensed carrier resource is ended, obtain a right to use the unlicensed carrier resource through a fallback operation in a contention time window;

the first monitoring unit 142 is arranged to, when the fallback operation in the contention time window succeeds, perform monitoring for a time length of T1; and the first determination unit 143 is arranged to, when it is found that the unlicensed carrier resource is idle through monitoring, determine that the obtaining of the right to use the unlicensed carrier resource succeeds.

Herein, the first obtaining unit 141 learns about a use situation of the unlicensed carrier resource used by a station which uses the unlicensed carrier resource, and when the station which uses the unlicensed carrier resource ends the use of the unlicensed carrier resource, the first obtaining unit 141 obtains a right to use the unlicensed carrier resource through a fallback operation in a contention time window. Herein, the first obtaining unit 141 may determine an end time point of the use of the unlicensed carrier resource used by the station which uses the unlicensed carrier resource according to received station time information which is sent by the station which uses the unlicensed carrier resource; and a mode of monitoring the unlicensed carrier resource in real time may also be adopted, e.g., the first obtaining unit 141 may monitor whether the unlicensed carrier resource is idle in real time, and if it is found that the unlicensed carrier resource is idle, the first obtaining unit 141 determines that the station which uses the unlicensed carrier resource ends the use of the unlicensed carrier resource.

Herein, in actual application, when the first obtaining unit 141 determines whether the station which uses the unlicensed carrier resource ends the use of the unlicensed carrier resource by adopting the mode of monitoring the unlicensed carrier resource in real time, the first obtaining unit 141 is specifically used for performing the following operation: monitoring whether the unlicensed carrier resource is idle in real time, and when it is found that the unlicensed carrier resource is idle, obtaining the right to use the unlicensed carrier resource through the fallback operation in the contention time window.

The operation of obtaining the right to use the unlicensed carrier resource through the fallback operation in the contention time window specifically includes the following operations:

the first obtaining unit 141 determines a fallback moment (selects a random fallback value) in the designated contention time window, and monitors the unlicensed carrier resource in the contention time window before the determined fallback moment (the fallback value is progressively decreased to 0); and when the determined fallback moment is reached (the fallback value is progressively decreased to 0) and it is found that the unlicensed carrier resource is idle through monitoring in the contention time window, the first obtaining unit 141 starts to send a channel occupation signal by using the unlicensed carrier resource at the determined fallback moment. At this moment, it indicates that the station which needs to obtain the unlicensed carrier resource successfully obtains the unlicensed carrier resource.

When the determined fallback moment is reached and it is found that the unlicensed carrier resource is idle through monitoring in the contention time window, it indicates that the first obtaining unit 141 successfully obtains the unlicensed carrier resource; and when the determined fallback moment is reached and it is found that the unlicensed carrier resource is busy through monitoring, it indicates that the first obtaining unit 141 fails to obtain the unlicensed carrier resource, and the first obtaining unit 141 stops a subsequent operation.

Here, the situation that it is found that the unlicensed carrier resource is busy through monitoring refers to that: the first obtaining unit 141 receives a signal in the unlicensed carrier resource and learns about that there is a signal sent by another station in the unlicensed carrier resource by parsing the signal; or receives a signal in the unlicensed carrier resource, and determines that energy of the unlicensed carrier resource exceeds a set energy threshold through energy detection.

Correspondingly, the situation that it is found that the unlicensed carrier resource is idle through monitoring refers to that: the first obtaining unit 141 receives a signal in the unlicensed carrier resource and learns about that there is no signal sent by other stations in the unlicensed carrier resource by parsing the signal; or receives a signal in the unlicensed carrier resource, and determines that energy of the unlicensed carrier resource does not exceed a set energy threshold through energy detection.

The operation of determining the fallback moment in the designated contention time window specifically includes the following operations:

the first obtaining unit 141 divides the contention time window into N parts and sequentially numbers as 0 to N−1; and the first obtaining unit 141 randomly generates a numerical value M between 0 and N−1, herein a moment corresponding to M is the determined fallback moment.

The station may further include: a first sending unit arranged to, when monitoring for the time length of T1 is performed and it is found that that the unlicensed carrier resource is idle through monitoring, before a next subframe comes, send a channel occupation signal by using the unlicensed carrier resource till a start moment of the next subframe.

Herein, the first monitoring unit 142 performs monitoring for a time length of T1 on the unlicensed carrier resource, and when a monitoring result is that the unlicensed carrier resource is idle, the first determination unit 143 determines that the obtaining of the right to use the unlicensed carrier resource succeeds; and when the monitoring result is that the unlicensed carrier resource is partially or completely busy, the first determination unit 143 determines the obtaining of the right to use the unlicensed carrier resource fails, stops the sending of the channel occupation signal in the unlicensed carrier resource and considers that the unlicensed carrier resource is used by another station (including a main system). By adopting this mode, it is continuous between the contention time window for the fallback operation and the end time point of the use of the unlicensed carrier resource used by another station. The time length T1 for monitoring is set to be after the fallback operation, at this moment only the station which successfully obtains the unlicensed carrier resource through contention performs monitoring, the number of stations which perform monitoring is greatly reduced and thereby stations which do not participate in monitoring can better perform data scheduling by using licensed carrier resources. At this moment, monitoring is mainly used for finding whether the main system uses the unlicensed carrier resource. Herein, the main system is a system with a higher priority, e.g., a military radar system.

The station further includes: a second sending unit arranged to, when it is determined that the obtaining of the right to use the unlicensed carrier resource succeeds and until a next subframe starts, schedule data by using the obtained unlicensed carrier resource.

A time start point that the second sending unit occupies the unlicensed carrier resource is a start point of the next subframe.

When the second sending unit determines that the obtaining of the right to use the unlicensed carrier resource succeeds and until a next subframe starts, the second sending unit sends control signaling by using the obtained unlicensed carrier resource to schedule UE data, or sends control signaling by using a licensed carrier resource paired with the unlicensed carrier resource to schedule UE data to be transmitted in the unlicensed carrier resource.

Herein, only when it is determined that the obtaining of the right to use the unlicensed carrier resource succeeds and until a next subframe starts, the second sending unit is allowed to send control signaling by using the obtained unlicensed carrier resource to schedule UE data. This is because that the LTE system is a synchronized system, i.e., uniform subframes are needed to align a time start point. In other words, the scheduling of the LTE system is performed by taking subframe as a unit. Therefore, when the station which needs to obtain the unlicensed carrier resource successfully obtains the unlicensed carrier resource and a next subframe still does not come, the station which needs to obtain the unlicensed carrier resource cannot schedule UE data. However, the station which needs to obtain the unlicensed carrier resource may send some signals such as time information about occupation of the unlicensed carrier resource, beacon signals for channel occupation and various reference signals, etc. The effect of sending these signals is to mainly enable other systems (e.g., WIFI system) to monitor that the unlicensed carrier resource is busy, so as to prevent these systems from occupying the unlicensed carrier resource which has already been obtained by the station which needs to obtain the unlicensed carrier resource. If there is no other system at the station which needs to obtain the unlicensed carrier resource, e.g., there are only the LTE-U (which is called so when LTE operates on unlicensed carriers) systems, the station which needs to obtain the unlicensed carrier resource may not send a channel occupation signal within a period of time from a moment when the obtaining of the unlicensed carrier resource succeeds to a start moment of a next subframe. This is because t the following agreement may be made between the LTE-U systems: if other stations consider that the obtaining of resources fails, the other stations will not obtain the unlicensed resource on this frequency point any longer until the moment of the next subframe, but may receive a signal sent by the station which needs to obtain the unlicensed carrier resource (if the station which needs to obtain the unlicensed carrier resource sends the channel occupation signal).

In actual application, the first obtaining unit and the first monitoring unit may be implemented through a Central Processing Unit (CPU), a Digital Signal Processor (DSP) or a Field Programmable Gate Array (FPGA) in combination with a transceiver in the station; the first determination unit may be implemented through a CPU, a DSP or an FPGA in the station; and the first sending unit and the second sending unit may be implemented through a transmitter in the station.

The station described in the present embodiment may be a base station, etc., and generally refers to a device that uses unlicensed carriers.

According to the station provided by the embodiment of the present document, when the station which uses the unlicensed carrier resource ends the use of the unlicensed carrier resource, the first obtaining unit 141 obtains the right to use the unlicensed carrier resource through the fallback operation in the contention time window; and when the fallback operation in the contention time window succeeds, the first monitoring unit 142 performs monitoring for the time length of T1, and when it is found that the unlicensed carrier resource is idle through monitoring, the first determination unit 143 determines that the obtaining of the right to use the unlicensed carrier resource succeeds. The frame structure provided by the embodiment of the present document is a listen-before-talk frame structure, the solution provided by the embodiment of the present document is a solution of a listen-before-talk mechanism, and by using the frame structure and the corresponding solution provided by the embodiment of the present document, unlicensed carrier resources can be efficiently obtained.

The solution provided by the embodiment of the present document enables the LTE system to be more efficient in the contention for unlicensed carrier resources.

In addition, the solution provided by the embodiment of the present document is also applicable to WIFI systems.

Figure 15:
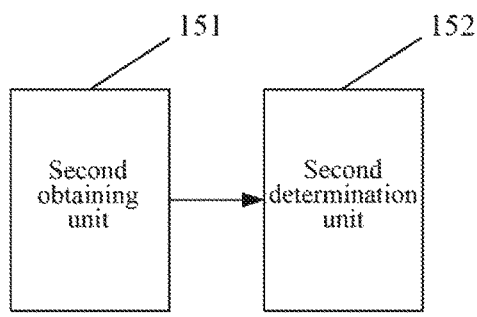
FIG. 15 illustrates a structural schematic diagram of a second station according to the embodiment of the present document.

In order to implement the method provided by embodiment 2, the embodiment of the present document further provides a station. As illustrated in FIG. 15, the station includes: a second obtaining unit 151 and a second determination unit 152, herein, the second obtaining unit 151 is arranged to, when it is determined that the use of an unlicensed carrier resource is ended, obtain a right to use the unlicensed carrier resource through a fallback operation in a contention time window; and the second determination unit 152 is arranged to, when the fallback operation in the contention time window succeeds and it is determined that a time interval between a fallback moment selected during the fallback operation and a use end moment of the unlicensed carrier resource is greater than or equal to T2, determine that the obtaining of the right to use the unlicensed carrier resource succeeds.

Herein, the second obtaining unit 151 learns about a use situation of the unlicensed carrier resource used by a station which uses the unlicensed carrier resource, and when the station which uses the unlicensed carrier resource ends the use of the unlicensed carrier resource, the second obtaining unit 151 obtains a right to use the unlicensed carrier resource through a fallback operation in a contention time window. Herein, the second obtaining unit 151 may determine an end time point of use of the unlicensed carrier resource used by the station which uses the unlicensed carrier resource according to received station time information which is sent by the station which uses the unlicensed carrier resource. A mode of monitoring the unlicensed carrier resource in real time may also be adopted, e.g., the second obtaining unit 151 may monitor whether the unlicensed carrier resource is idle in real time, and if it is found that the unlicensed carrier resource is idle, the second obtaining unit 151 determines that the station which uses the unlicensed carrier resource ends the use of the unlicensed carrier resource.

Herein, in actual application, when the second obtaining unit 151 determines whether the station which uses the unlicensed carrier resource ends the use of the unlicensed carrier resource by adopting the mode of monitoring the unlicensed carrier resource in real time, the second obtaining unit 151 may be specifically used for performing the following operations:

Whether the unlicensed carrier resource is idle is monitored in real time, and when it is found that the unlicensed carrier resource is idle, the right to use the unlicensed carrier resource is obtained through the fallback operation in the contention time window.

The operation of obtaining the right to use the unlicensed carrier resource through the fallback operation in the contention time window specifically includes the following operations:

the second obtaining unit 151 determines a fallback moment (selects a random fallback value) in the designated contention time window, and monitors the unlicensed carrier resource in the contention time window before the determined fallback moment (the fallback value is progressively decreased to 0); and when the determined fallback moment is reached (the fallback value is progressively decreased to 0) and it is found that the unlicensed carrier resource is idle through monitoring in the contention time window, a channel occupation signal is started to be sent by using the unlicensed carrier resource at the determined fallback moment. At this moment, it indicates that the second obtaining unit 151 successfully obtains the unlicensed carrier resource.

When the determined fallback moment is reached and it is found that the unlicensed carrier resource is idle through monitoring in the contention time window, it indicates that the second obtaining unit 151 successfully obtains the unlicensed carrier resource, i.e., the fallback operation succeeds; and when the determined fallback moment is reached and it is found that the unlicensed carrier resource is busy through monitoring, it indicates that the second obtaining unit 151 fails to obtain the unlicensed carrier resource, i.e., the fallback operation fails, and a subsequent operation is stopped.

Here, the situation that it is found that the unlicensed carrier resource is busy through monitoring refers to that: the second obtaining unit 151 receives a signal in the unlicensed carrier resource and learns about that there is a signal sent by another station in the unlicensed carrier resource by parsing the signal; or receives a signal in the unlicensed carrier resource, and determines that energy of the unlicensed carrier resource exceeds a set energy threshold through energy detection.

Correspondingly, the situation that it is found that the unlicensed carrier resource is idle through monitoring refers to that: the second obtaining unit 151 receives a signal in the unlicensed carrier resource and learns about that there is no signal sent by other stations in the unlicensed carrier resource by parsing the signal; or receives a signal in the unlicensed carrier resource, and determines that energy of the unlicensed carrier resource does not exceed a set energy threshold through energy detection.

The operation of determining the fallback moment in the designated contention time window specifically includes the following operations:

the second obtaining unit 151 divides the contention time window into N parts and sequentially numbers as 0 to N−1; and randomly generates a numerical value M between 0 and N−1, herein a moment corresponding to M is the determined fallback moment.

The station may further include: a second monitoring unit and a third sending unit, herein, the second monitoring unit is arranged to, when it is determined that the time interval between the fallback moment selected during the fallback operation and the use end moment of the unlicensed carrier resource is less than T2, perform monitoring for a time length of T2; and the third sending unit is arranged to, when it is found that the unlicensed carrier resource is idle through monitoring and before a next subframe comes, send a channel occupation signal by using the unlicensed carrier resource till a start moment of the next subframe.

In one embodiment, the second monitoring unit is arranged to, when it is determined that the time interval between the fallback moment selected during the fallback operation and the use end moment of the unlicensed carrier resource is less than T2, perform monitoring for a time length of T2; and the second determination unit 152 is further arranged to, when it is found that the unlicensed carrier resource is idle through monitoring, determine that the obtaining of the right to use the unlicensed carrier resource succeeds.

The station may further include: a fourth sending unit arranged to, when the second determination unit 152 determines that the time interval between the fallback moment selected during the fallback operation and the use end moment of the unlicensed carrier resource is less than T2, after the obtaining of the right to use the unlicensed carrier resource succeeds, send a channel occupation signal by using the unlicensed carrier resource till a start moment of a next subframe.

Here, the use end moment of the unlicensed carrier resource refers to a moment when the other stations which use the unlicensed carrier resource end the use of the unlicensed carrier resource.

In one embodiment, in the LTE system, the time interval between the fallback moment selected during the fallback operation and the use end moment of the unlicensed carrier resource may be a time interval between the fallback moment selected during the fallback operation and a previous subframe.

After the fallback operation in the contention time window succeeds, the second determination unit 152 judges whether the time interval between the fallback moment selected during the fallback operation and the use end moment of the unlicensed carrier resource is greater than or equal to T2, and when it is determined that the time interval is greater than or equal to T2, it is considered that the obtaining of the right to use the unlicensed carrier resource succeeds; when it is determined that the time interval is less than T2, the second monitoring unit performs monitoring for a time length of T2; when it is found that the unlicensed carrier resource is idle through monitoring, the second determination unit 152 considers that the obtaining of the right to use the unlicensed carrier resource succeeds, and when it is found that the unlicensed carrier resource is busy through monitoring, the second determination unit 152 considers that the obtaining of the right to use the unlicensed carrier resource fails; and when it is found that the unlicensed carrier resource is idle through monitoring and a time point of the end of monitoring for the time length of T2 still does not reach a start moment of a next subframe, the third sending unit sends the channel occupation signal by using the unlicensed carrier resource till the start moment of the next subframe.

Herein, the second monitoring unit performs monitoring for a time length of T2 to the unlicensed carrier resource, and when a monitoring result is that the unlicensed carrier resource is idle, the second determination unit 152 determines that the obtaining of the right to use the unlicensed carrier resource succeeds; and when the monitoring result is that the unlicensed carrier resource is partially or completely busy, the second determination unit 152 determines that the obtaining of the right to use the unlicensed carrier resource fails, stops the sending of the channel occupation signal in the unlicensed carrier resource and considers that the unlicensed carrier resource is used by another station (including a main system). By adopting this mode, it is continuous between the contention time window for the fallback operation and the end time point of the use of the unlicensed carrier resource used by another station. The time length T2 for monitoring is set to be after the fallback operation, at this moment only the station which successfully obtains the unlicensed carrier resource through contention performs monitoring, the number of stations which perform monitoring is greatly reduced and thereby stations which do not participate in monitoring can better perform data scheduling by using licensed carrier resources. At this moment, monitoring is mainly used for finding whether the main system uses the unlicensed carrier resource. Herein, the main system is a system with a higher priority, e.g., a military radar system.

The station may further include: a fifth sending unit arranged to, when it is determined that the obtaining of the right to use the unlicensed carrier resource succeeds and until a next subframe starts, schedule data by using the obtained unlicensed carrier resource.

A time start point that the fifth sending unit occupies the unlicensed carrier resource is a start point of the next subframe.

When the fifth sending unit determines that the obtaining of the right to use the unlicensed carrier resource succeeds and until a next subframe starts, the fifth sending unit sends control signaling by using the obtained unlicensed carrier resource to schedule UE data, or sends control signaling by using a licensed carrier resource paired with the unlicensed carrier resource to schedule UE data to be transmitted in the unlicensed carrier resource.

Herein, only when it is determined that the obtaining of the right to use the unlicensed carrier resource succeeds and until a next subframe starts, the fifth sending unit is allowed to send control signaling by using the obtained unlicensed carrier resource to schedule UE data. This is because that the LTE system is a synchronized system, i.e., uniform subframes are needed to align a time start point. In other words, the scheduling of the LTE system is performed by taking subframe as a unit. Therefore, when the station which needs to obtain the unlicensed carrier resource successfully obtains the unlicensed carrier resource and a next subframe still does not come, the station which needs to obtain the unlicensed carrier resource cannot schedule UE data. However, the station which needs to obtain the unlicensed carrier resource may send some signals such as time information about occupation of the unlicensed carrier resource, beacon signals for channel occupation and various reference signals, etc. The effect of sending these signals is mainly to enable other systems (e.g., WIFI system) to monitor that the unlicensed carrier resource is busy, so as to prevent these systems from occupying the unlicensed carrier resource which has already been obtained by the station which needs to obtain the unlicensed carrier resource. If there is no other system at the station which needs to obtain the unlicensed carrier resource, e.g., there are only the LTE-U (which is called so when LTE operates on unlicensed carriers) systems, the station which needs to obtain the unlicensed carrier resource may not send a channel occupation signal within a period of time from a moment when the obtaining of the unlicensed carrier resource succeeds to a start moment of a next subframe. This is because that the following agreement may be made between the LTE-U systems: if other stations consider that the obtaining of resources fails, the other stations will not obtain the unlicensed resource on this frequency point any longer until the moment of the next subframe, but may receive a signal sent by the station which needs to obtain the unlicensed carrier resource (if the station which needs to obtain the unlicensed carrier resource sends the channel occupation signal).

The station described in the present embodiment may be a base station, etc., and generally refers to a device that uses unlicensed carriers.

In actual application, the second obtaining unit and the second monitoring unit may be implemented through a CPU, a DSP or an FPGA in combination with a transceiver in the station; the second determination unit may be implemented through a CPU, a DSP or an FPGA in the station; and the third sending unit, the fourth sending unit and the fifth sending unit may be implemented through a transmitter in the station.

According to the station provided by the embodiment of the present document, when the station which uses the unlicensed carrier resource ends the use of the unlicensed carrier resource, the second obtaining unit 151 obtains the right to use the unlicensed carrier resource through the fallback operation in the contention time window; and when the fallback operation in the contention time window succeeds and it is determined that the time interval between the fallback moment selected during the fallback operation and the use end moment of the unlicensed carrier resource is greater than or equal to T2, the second determination unit 152 determines that the obtaining of the right to use the unlicensed carrier resource succeeds. The frame structure provided by the embodiment of the present document is a listen-before-talk frame structure, the solution provided by the embodiment of the present document is a solution of a listen-before-talk mechanism, and by using the frame structure and the corresponding solution provided by the embodiment of the present document, unlicensed carrier resources can be efficiently obtained.

The solution provided by the embodiment of the present document enables the LTE system to be more efficient in the contention for unlicensed carrier resources.

In addition, the solution provided by the embodiment of the present document is also applicable to WIFI systems.

Figure 16:
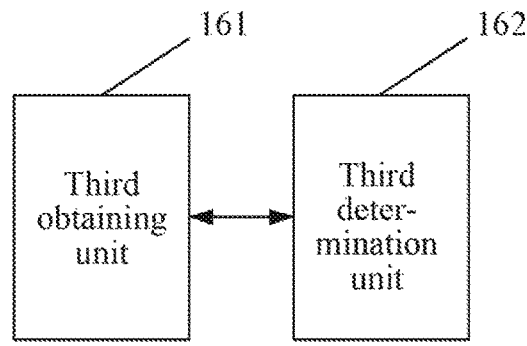
FIG. 16 illustrates a structural schematic diagram of a third station according to the embodiment of the present document.

In order to implement the method provided by embodiment 3, the embodiment of the present document further provides a station. As illustrated in FIG. 16, the station includes: a third obtaining unit 161 and a third determination unit 162, herein, the third obtaining unit 161 is arranged to, when it is determined that use of an unlicensed carrier resource is ended, obtain a right to use the unlicensed carrier resource through a fallback operation in a contention time window; and the third determination unit 162 is arranged to, in a process of obtaining the right to use the unlicensed carrier resource through the fallback operation in the contention time window, when it is determined that a time interval between a selected fallback moment and a use end moment of the unlicensed carrier resource is greater than or equal to T3, trigger the third obtaining unit to continue to perform the fallback operation to obtain the right to use the unlicensed carrier resource.

Here, the third obtaining unit 161 learns about a use situation of the unlicensed carrier resource used by a station which uses the unlicensed carrier resource, and when the station which uses the unlicensed carrier resource ends the use of the unlicensed carrier resource, the third obtaining unit 161 obtains a right to use the unlicensed carrier resource through a fallback operation in a contention time window. Herein, the third obtaining unit 161 may determine an end time point of the use of the unlicensed carrier resource used by the station which uses the unlicensed carrier resource according to received station time information which is sent by the station which uses the unlicensed carrier resource. A mode of monitoring the unlicensed carrier resource in real time may also be adopted, e.g., the third obtaining unit 161 may monitor whether the unlicensed carrier resource is idle in real time, and if it is found that the unlicensed carrier resource is idle, the third obtaining unit 161 determines that the station which uses the unlicensed carrier resource ends the use of the unlicensed carrier resource.

Herein, in actual application, when the station which needs to obtain the unlicensed carrier resource determines whether the station which uses the unlicensed carrier resource ends the use of the unlicensed carrier resource by adopting the mode of monitoring the unlicensed carrier resource in real time, the third obtaining unit 161 may be specifically used for performing the following operations:

Whether the unlicensed carrier resource is idle is monitored in real time, and when it is found that the unlicensed carrier resource is idle, the station which needs to obtain the unlicensed carrier resource obtains the right to use the unlicensed carrier resource through the fallback operation in the contention time window.

The operation of obtaining the right to use the unlicensed carrier resource through the fallback operation in the contention time window specifically includes the following operations:

the third obtaining unit 161 determines a fallback moment (selects a random fallback value) in the designated contention time window, and monitors the unlicensed carrier resource in the contention time window before the determined fallback moment (the fallback value is progressively decreased to 0); and when the determined fallback moment is reached (the fallback value is progressively decreased to 0) and it is found that the unlicensed carrier resource is idle through monitoring in the contention time window, a channel occupation signal is started to be sent by using the unlicensed carrier resource at the determined fallback moment. At this moment, it indicates that the third obtaining unit 161 successfully obtains the unlicensed carrier resource.

When the determined fallback moment is reached and it is found that the unlicensed carrier resource is idle through monitoring in the contention time window, it indicates that the third obtaining unit 161 successfully obtains the unlicensed carrier resource; and when the determined fallback moment is reached and it is found that the unlicensed carrier resource is busy through monitoring, it indicates that the third obtaining unit 161 fails to obtain the unlicensed carrier resource, and a subsequent operation is stopped.

Here, the situation that it is found that the unlicensed carrier resource is busy through monitoring refers to that: the third obtaining unit 161 receives a signal in the unlicensed carrier resource and learns about that there is a signal sent by another station in the unlicensed carrier resource by parsing the signal; or receives a signal in the unlicensed carrier resource, and determines that energy of the unlicensed carrier resource exceeds a set energy threshold through energy detection.

Correspondingly, the situation that it is found that the unlicensed carrier resource is idle through monitoring refers to that: the third obtaining unit 161 receives a signal in the unlicensed carrier resource and learns about that there is no signal sent by other stations in the unlicensed carrier resource by parsing the signal; or receives a signal in the unlicensed carrier resource, and determines that energy of the unlicensed carrier resource does not exceed a set energy threshold through energy detection.

The operation of determining the fallback moment in the designated contention time window specifically includes the following operations:

the third obtaining unit 161 divides the contention time window into N parts and sequentially numbers as 0 to N−1; and randomly generates a numerical value M between 0 and N−1, herein a moment corresponding to M is the determined fallback moment.

When it is determined that the time interval between the determined fallback moment and the start moment of the contention time window is less than T3, the third determination unit 162 uses T3 as the selected fallback moment and triggers the third obtaining unit 161 to continue to perform the fallback operation; or notifies the third obtaining unit 161 to stop the fallback operation and considers that the obtaining of the right to use the unlicensed carrier resource fails.

Herein, the situation that the fallback operation succeeds refers to that: the randomly generated fallback value is progressively decreased to 0.

In actual application, when it is determined that the time interval between the determined fallback moment and the use end moment of the unlicensed carrier resource is less than T3, the station which needs to obtain the unlicensed carrier resource is set such that a probability of successfully obtaining the unlicensed carrier resource through contention at a next time is greatly improved, i.e., the station which needs to obtain the unlicensed carrier resource is set to have a higher probability of obtaining the unlicensed carrier resource than other stations. For example, the contention time window of the station which needs to obtain the unlicensed carrier resource at a next time of contention may be set to be relatively small (but greater than T3), and the fallback moment selected by the station which needs to obtain the unlicensed carrier resource may be set to be just after moment T3; or, the station which needs to obtain the unlicensed carrier resource adjusts the selected fallback moment to be a first moment after moment T3 and obtains the unlicensed carrier resource again through the fallback operation.

The station may further include: a sixth sending unit arranged to, when it is determined that the obtaining of the right to use the unlicensed carrier resource succeeds and until a next subframe starts, schedule data by using the obtained unlicensed carrier resource.

Here, a time start point that the sixth sending unit occupies the unlicensed carrier resource is a start point of the next subframe.

When the obtaining of the right to use the unlicensed carrier resource through the fallback operation succeeds and before a next subframe comes, the sixth sending unit sends the channel occupation signal till a start moment of a next subframe.

When the sixth sending unit determines that the obtaining of the right to use the unlicensed carrier resource succeeds and until a next subframe starts, the sixth sending unit sends control signaling by using the obtained unlicensed carrier resource to schedule UE data, or sends control signaling by using a licensed carrier resource paired with the unlicensed carrier resource to schedule UE data to be transmitted in the unlicensed carrier resource.

Herein, only when it is determined that the obtaining of the right to use the unlicensed carrier resource succeeds and until a next subframe starts, the sixth sending unit is allowed to send control signaling by using the obtained unlicensed carrier resource to schedule UE data. This is because that the LTE system is a synchronized system, i.e., uniform subframes are needed to align a time start point. In other words, the scheduling of the LTE system is performed by taking subframe as a unit. Therefore, when the station which needs to obtain the unlicensed carrier resource successfully obtains the unlicensed carrier resource and a next subframe still does not come, the station which needs to obtain the unlicensed carrier resource cannot schedule UE data. However, the station which needs to obtain the unlicensed carrier resource may send some signals such as time information about occupation of the unlicensed carrier resource, beacon signals for channel occupation and various reference signals, etc. The effect of sending these signals is mainly to enable other systems (e.g., WIFI system) to monitor that the unlicensed carrier resource is busy, so as to prevent these systems from occupying the unlicensed carrier resource which has already been obtained by the station which needs to obtain the unlicensed carrier resource. If there is no other system at the station which needs to obtain the unlicensed carrier resource, e.g., there are only the LTE-U (which is called so when LTE operates on unlicensed carriers) systems, the station which needs to obtain the unlicensed carrier resource may not send a channel occupation signal within a period of time from a moment when the obtaining of the unlicensed carrier resource succeeds to a start moment of a next subframe. This is because that the following agreement may be made between the LTE-U systems: if other stations consider that the obtaining of resources fails, the other stations will not obtain the unlicensed resource on this frequency point any longer until the moment of the next subframe, but may receive a signal sent by the station which needs to obtain the unlicensed carrier resource (if the station which needs to obtain the unlicensed carrier resource sends the channel occupation signal).

The station described in the present embodiment may be a base station, etc., and generally refers to a device that uses unlicensed carriers.

In actual application, the third obtaining unit may be implemented through a CPU, a DSP or an FPGA in combination with a transceiver in the station; the third determination unit may be implemented through a CPU, a DSP or an FPGA in the station; and the sixth sending unit may be implemented through a transmitter in the station.

According to the station provided by the embodiment of the present document, when it is determined that the use of the unlicensed carrier resource is ended, the third obtaining unit 161 obtains the right to use the unlicensed carrier resource through the fallback operation in the contention time window; and in the process of obtaining the right to use the unlicensed carrier resource through the fallback operation in the contention time window, when the third determination unit 162 determines that the time interval between the selected fallback moment and the use end moment of the unlicensed carrier resource is greater than or equal to T3, the fallback operation is performed to obtain the right to use the unlicensed carrier resource. The frame structure provided by the embodiment of the present document is a listen-before-talk frame structure, the solution provided by the embodiment of the present document is a solution of a listen-before-talk mechanism, and by using the frame structure and the corresponding solution provided by the embodiment of the present document, unlicensed carrier resources can be efficiently obtained.

The solution provided by the embodiment of the present document enables the LTE system to be more efficient in the contention for unlicensed carrier resources.

In addition, the solution provided by the embodiment of the present document is also applicable to WIFI systems.

Figure 17:
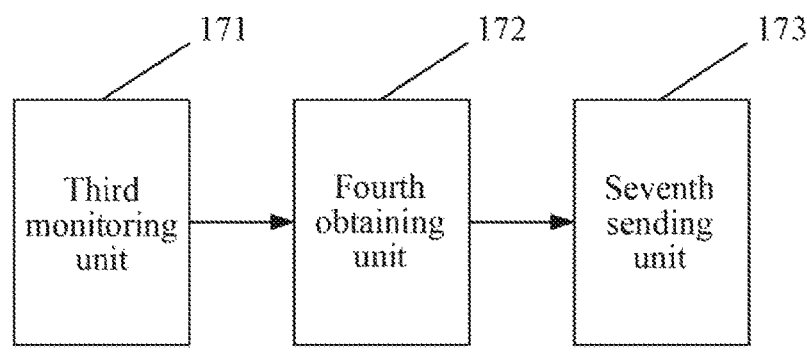
FIG. 17 illustrates a structural schematic diagram of a fourth station according to the embodiment of the present document.

In order to implement the method provided by embodiment 4, the embodiment of the present document further provides a station. As illustrated in FIG. 17, the station includes: a third monitoring unit 171, a fourth obtaining unit 172 and a seventh sending unit 173, herein, the third monitoring unit 171 is arranged to, when it is determined that use of an unlicensed carrier resource is ended, perform monitoring for a time length of T4 on the unlicensed carrier resource;

the fourth obtaining unit 172 is arranged to, when it is found that the unlicensed carrier resource is idle through the monitoring, obtain a right to use the unlicensed carrier resource through a fallback operation in a contention time window; and the seventh sending unit 173 is arranged to, when the obtaining of the right to use the unlicensed carrier resource in the contention time window succeeds, send a channel occupation signal by using the unlicensed carrier resource.

The third monitoring unit 171 learns about a use situation of the unlicensed carrier resource used by a station which uses the unlicensed carrier resource, and when the station which uses the unlicensed carrier resource ends the use of the unlicensed carrier resource, monitoring for a time length of T4 is performed on the unlicensed carrier resource.

Herein, the third monitoring unit 171 may determine an end time point of use of the unlicensed carrier resource used by the station which uses the unlicensed carrier resource according to received station time information which is sent by the station which uses the unlicensed carrier resource; and a mode of monitoring the unlicensed carrier resource in real time may also be adopted, e.g., the third monitoring unit 171 may monitor whether the unlicensed carrier resource is idle in real time, and if it is found that the unlicensed carrier resource is idle, the third monitoring unit 171 determines that the station which uses the unlicensed carrier resource ends the use of the unlicensed carrier resource.

Herein, in actual application, when the station which needs to obtain the unlicensed carrier resource determines whether the station which uses the unlicensed carrier resource ends the use of the unlicensed carrier resource by adopting the mode of monitoring the unlicensed carrier resource in real time, the third monitoring unit 171 may be specifically used for performing the following operations:

Whether the unlicensed carrier resource is idle is monitored in real time, and when it is found that the unlicensed carrier resource is idle, the station which needs to obtain the unlicensed carrier resource performs monitoring for a time length of T4 on the unlicensed carrier resource.

The operation of obtaining the right to use the unlicensed carrier resource through the fallback operation in the contention time window specifically includes the following operations:

the fourth obtaining unit 172 determines a fallback moment (selects a random fallback value) in the designated contention time window, and monitors the unlicensed carrier resource in the contention time window before the determined fallback moment (the fallback value is progressively decreased to 0); and when the determined fallback moment is reached (the fallback value is progressively decreased to 0) and it is found that the unlicensed carrier resource is idle through monitoring in the contention time window, a channel occupation signal is started to be sent by using the unlicensed carrier resource at the determined fallback moment. At this moment, it indicates that the fourth obtaining unit 172 successfully obtains the unlicensed carrier resource.

When the determined fallback moment is reached and it is found that the unlicensed carrier resource is idle through monitoring in the contention time window, it indicates that the fourth obtaining unit 172 successfully obtains the unlicensed carrier resource; and when the determined fallback moment is reached and it is found that the unlicensed carrier resource is busy through monitoring, it indicates that the fourth obtaining unit 172 fails to obtain the unlicensed carrier resource, and a subsequent operation is stopped.

Here, the situation that it is found that the unlicensed carrier resource is busy through monitoring refers to that: the fourth obtaining unit 172 receives a signal in the unlicensed carrier resource and learns about that there is a signal sent by another station in the unlicensed carrier resource by parsing the signal; or receives a signal in the unlicensed carrier resource, and determines that energy of the unlicensed carrier resource exceeds a set energy threshold through energy detection.

Correspondingly, the situation that it is found that the unlicensed carrier resource is idle through monitoring refers to that: the fourth obtaining unit 172 receives a signal in the unlicensed carrier resource and learns about that there is no signal sent by other stations in the unlicensed carrier resource by parsing the signal; or receives a signal in the unlicensed carrier resource, and determines that energy of the unlicensed carrier resource does not exceed a set energy threshold through energy detection.

The operation of determining the fallback moment in the designated contention time window specifically includes the following operations:

the fourth obtaining unit 172 divides the contention time window into N parts and sequentially numbers as 0 to N−1; and randomly generates a numerical value M between 0 and N−1, herein a moment corresponding to M is the determined fallback moment.

The station may further include: an eighth sending unit arranged to, when it is determined that the obtaining of the right to use the unlicensed carrier resource succeeds and until a next subframe starts, schedule data by using the obtained unlicensed carrier resource.

Here, a time start point that the eighth sending unit occupies the unlicensed carrier resource is a start point of the next subframe. In other words, the sixth sending unit 173 sends a channel occupation signal by using the unlicensed carrier resource till a start moment of the next subframe.

When the eighth sending unit determines that the obtaining of the right to use the unlicensed carrier resource succeeds and until a next subframe starts, the eighth sending unit sends control signaling by using the obtained unlicensed carrier resource to schedule UE data, or sends control signaling by using a licensed carrier resource paired with the unlicensed carrier resource to schedule UE data to be transmitted in the unlicensed carrier resource.

Herein, only when it is determined that the obtaining of the right to use the unlicensed carrier resource succeeds and until a next subframe starts, the eighth sending unit is allowed to send control signaling by using the obtained unlicensed carrier resource to schedule UE data. This is because that the LTE system is a synchronized system, i.e., uniform subframes are needed to align a time start point. In other words, the scheduling of the LTE system is performed by taking subframe as a unit. Therefore, when the station which needs to obtain the unlicensed carrier resource successfully obtains the unlicensed carrier resource and a next subframe still does not come, the station which needs to obtain the unlicensed carrier resource cannot schedule UE data. However, the station which needs to obtain the unlicensed carrier resource may send some signals such as time information about occupation of the unlicensed carrier resource, beacon signals for channel occupation and various reference signals, etc. The effect of sending these signals is mainly to enable other systems (e.g., WIFI system) to monitor that the unlicensed carrier resource is busy, so as to prevent these systems from occupying the unlicensed carrier resource which has already been obtained by the station which needs to obtain the unlicensed carrier resource. If there is no other system at the station which needs to obtain the unlicensed carrier resource, e.g., there are only the LTE-U (which is called so when LTE operates on unlicensed carriers) systems, the station which needs to obtain the unlicensed carrier resource may not send a channel occupation signal within a period of time from a moment when the obtaining of the unlicensed carrier resource succeeds to a start moment of a next subframe. This is because that the following agreement may be made between the LTE-U systems: if other stations consider that the obtaining of resources fails, the other stations will not obtain the unlicensed resource on this frequency point any longer until the moment of the next subframe, but may receive a signal sent by the station which needs to obtain the unlicensed carrier resource (if the station which needs to obtain the unlicensed carrier resource sends the channel occupation signal).

The station described in the present embodiment may be a base station, etc., and generally refers to a device that uses unlicensed carriers.

In actual application, the third monitoring unit and the fourth obtaining unit may be implemented through a CPU, a DSP or an FPGA in combination with a transceiver in the station; and the seventh sending unit and the eighth sending unit may be implemented through a transmitter in the station.

According to the station provided by the embodiment of the present document, when it is determined that the use of the unlicensed carrier resource is ended, the third monitoring unit 171 performs monitoring for the time length of T4 on the unlicensed carrier resource; when it is found that the unlicensed carrier resource is idle through monitoring, the fourth obtaining unit 172 obtains the right to use the unlicensed carrier resource through the fallback operation in the contention time window; and when the time of the contention time window is ended and it is determined that the obtaining of the right to use the unlicensed carrier resource succeeds, the seventh sending unit sends the channel occupation signal by using the unlicensed carrier resource till the start moment of the next subframe. The frame structure provided by the embodiment of the present document is a listen-before-talk frame structure, the solution provided by the embodiment of the present document is a solution of a listen-before-talk mechanism, and by using the frame structure and the corresponding solution provided by the embodiment of the present document, unlicensed carrier resources can be efficiently obtained.

The solution provided by the embodiment of the present document enables the LTE system to be more efficient in the contention for unlicensed carrier resources.

In addition, the solution provided by the embodiment of the present document is also applicable to WIFI systems.

Figure 18:
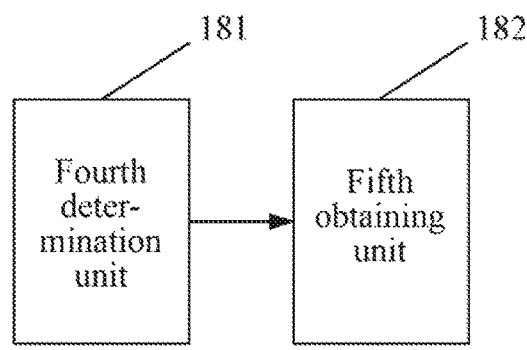
FIG. 18 illustrates a structural schematic diagram of a fifth station according to the embodiment of the present document.

In order to implement the method provided by embodiment 5, the embodiment of the present document further provides a station. As illustrated in FIG. 18, the station includes: a fourth determination unit 181 and a fifth obtaining unit 182, herein, the fourth determination unit 181 is arranged to determine whether the use of an unlicensed carrier resource is ended, and when it is determined that the use of the unlicensed carrier resource is ended, trigger the fifth obtaining unit 182; and the fifth obtaining unit 182 is arranged to obtain a right to use the unlicensed carrier resource directly through a fallback operation in a contention time window after receiving a trigger from the fourth determination unit.

In other words, the fourth determination unit 181 learns about a use situation of the unlicensed carrier resource used by a station which uses the unlicensed carrier resource, and when the station which uses the unlicensed carrier resource ends the use of the unlicensed carrier resource, the fifth obtaining unit 182 is only triggered to obtain a right to use the unlicensed carrier resource through a fallback operation in a contention time window. Herein, the fourth determination unit 181 may determine an end time point of use of the unlicensed carrier resource used by the station which uses the unlicensed carrier resource according to received station time information which is sent by the station which uses the unlicensed carrier resource. A mode of monitoring the unlicensed carrier resource in real time may also be adopted, e.g., the fourth determination unit 181 may monitor whether the unlicensed carrier resource is idle in real time, and if it is found that the unlicensed carrier resource is idle, the fourth determination unit 181 determines that the station which uses the unlicensed carrier resource ends the use of the unlicensed carrier resource.

Herein, in actual application, when the fourth determination unit 181 determines whether the station which uses the unlicensed carrier resource ends the use of the unlicensed carrier resource by adopting the mode of monitoring the unlicensed carrier resource in real time, the fourth determination unit 181 may be specifically used for performing the following operations:

Whether the unlicensed carrier resource is idle is monitored in real time, and when it is found that the unlicensed carrier resource is idle, the fifth obtaining unit 182 is triggered to obtain the right to use the unlicensed carrier resource directly through the fallback operation in the contention time window.

In other words, the fourth determination unit 181 performs monitoring for a time length of T5 on the unlicensed carrier resource; and when it is found that the unlicensed carrier resource is idle through monitoring, the fifth obtaining unit 182 is triggered to obtain the right to use the unlicensed carrier resource directly through the fallback operation in the contention time window.

The operation of obtaining the right to use the unlicensed carrier resource through the fallback operation in the contention time window specifically includes the following operations:

the fifth obtaining unit 182 determines a fallback moment (selects a random fallback value) in the designated contention time window, and monitors the unlicensed carrier resource in the contention time window before the determined fallback moment (the fallback value is progressively decreased to 0); and when the determined fallback moment is reached (the fallback value is progressively decreased to 0) and it is found that the unlicensed carrier resource is idle through monitoring in the contention time window, a channel occupation signal is started to be sent by using the unlicensed carrier resource at the determined fallback moment. At this moment, it indicates that the fifth obtaining unit 182 successfully obtains the unlicensed carrier resource.

When the determined fallback moment is reached and it is found that the unlicensed carrier resource is idle through monitoring in the contention time window, it indicates that the fifth obtaining unit 182 successfully obtains the unlicensed carrier resource; and when the determined fallback moment is reached and it is found that the unlicensed carrier resource is busy through monitoring, it indicates that the fifth obtaining unit 182 fails to obtain the unlicensed carrier resource, and a subsequent operation is stopped.

Here, the situation that it is found that the unlicensed carrier resource is busy through monitoring refers to that: the fifth obtaining unit 182 receives a signal in the unlicensed carrier resource and learns about that there is a signal sent by another station in the unlicensed carrier resource by parsing the signal; or receives a signal in the unlicensed carrier resource, and determines that energy of the unlicensed carrier resource exceeds a set energy threshold through energy detection.

Correspondingly, the situation that it is found that the unlicensed carrier resource is idle through monitoring refers to that: the fifth obtaining unit 182 receives a signal in the unlicensed carrier resource and learns about that there is no signal sent by other stations in the unlicensed carrier resource by parsing the signal; or receives a signal in the unlicensed carrier resource, and determines that energy of the unlicensed carrier resource does not exceed a set energy threshold through energy detection.

The operation of determining the fallback moment in the designated contention time window specifically includes the following operations:

the fifth obtaining unit 182 divides the contention time window into N parts and sequentially numbers as 0 to N−1; and randomly generates a numerical value M between 0 and N−1, herein a moment corresponding to M is the determined fallback moment.

The station may further include: a tenth sending unit arranged to, when it is determined that the obtaining of the right to use the unlicensed carrier resource succeeds and before a next subframe comes, send a channel occupation signal by using the unlicensed carrier resource till a start moment of the next subframe.

The station may further include: a ninth sending unit arranged to, when it is determined that the obtaining of the right to use the unlicensed carrier resource succeeds and until a next subframe starts, schedule data by using the obtained unlicensed carrier resource.

Here, a time start point that the ninth sending unit occupies the unlicensed carrier resource is a start point of the next subframe.

When the ninth sending unit determines that the obtaining of the right to use the unlicensed carrier resource succeeds and until a next subframe starts, the ninth sending unit sends control signaling by using the obtained unlicensed carrier resource to schedule UE data, or sends control signaling by using a licensed carrier resource paired with the unlicensed carrier resource to schedule UE data to be transmitted in the unlicensed carrier resource.

Herein, only when it is determined that the obtaining of the right to use the unlicensed carrier resource succeeds and until a next subframe starts, the ninth sending unit is allowed to send control signaling by using the obtained unlicensed carrier resource to schedule UE data. This is because that the LTE system is a synchronized system, i.e., uniform subframes are needed to align a time start point. In other words, the scheduling of the LTE system is performed by taking subframe as a unit. Therefore, when the station which needs to obtain the unlicensed carrier resource successfully obtains the unlicensed carrier resource and a next subframe still does not come, the station which needs to obtain the unlicensed carrier resource cannot schedule UE data. However, the station which needs to obtain the unlicensed carrier resource may send some signals such as time information about occupation of the unlicensed carrier resource, beacon signals for channel occupation and various reference signals, etc. The effect of sending these signals is mainly to enable other systems (e.g., WIFI system) to monitor that the unlicensed carrier resource is busy, so as to prevent these systems from occupying the unlicensed carrier resource which has already been obtained by the station which needs to obtain the unlicensed carrier resource. If there is no other system at the station which needs to obtain the unlicensed carrier resource, e.g., there are only the LTE-U (which is called so when LTE operates on unlicensed carriers) systems, the station which needs to obtain the unlicensed carrier resource may not send a channel occupation signal within a period of time from a moment when the obtaining of the unlicensed carrier resource succeeds to a start moment of a next subframe. This is because that the following agreement may be made between the LTE-U systems: if other stations consider that the obtaining of resources fails, the other stations will not obtain the unlicensed resource on this frequency point any longer until the moment of the next subframe, but may receive a signal sent by the station which needs to obtain the unlicensed carrier resource (if the station which needs to obtain the unlicensed carrier resource sends the channel occupation signal).

The station described in the present embodiment may be a base station, etc., and generally refers to a device that uses unlicensed carriers.

In actual application, the fifth obtaining unit may be implemented through a CPU, a DSP or an FPGA in combination with a transceiver in the station; the fourth determination unit may be implemented through a CPU, a DSP or an FPGA in the station; and the ninth sending unit and the tenth sending unit may be implemented through a transmitter in the station.

According to the resource obtaining solution provided by the embodiment of the present document, when it is determined that the use of the unlicensed carrier resource is ended, the right to use the unlicensed carrier resource is obtained directly through the fallback operation in the contention time window. The frame structure provided by the embodiment of the present document is a listen-beforetalk frame structure, the solution provided by the embodiment of the present document is a solution of a listen-before-talk mechanism, and by using the frame structure and the corresponding solution provided by the embodiment of the present document, unlicensed carrier resources can be efficiently obtained.

The solution provided by the embodiment of the present document enables the LTE system to be more efficient in the contention for unlicensed carrier resources.

In addition, the solution provided by the embodiment of the present document is also applicable to WIFI systems. The solutions provided by the embodiments of the present document may be used in parallel under the situation of no conflict. For example, the mode illustrated in FIG. 9 and the mode illustrated in FIG. 13 may be combined, herein the mode illustrated in FIG. 9 is used by the station which ends the use of the unlicensed carrier resource at a previous time, and the mode illustrated in FIG. 13 is used by the station which is to obtain the unlicensed carrier resource.

One skilled in the art shall understand that the embodiments of the present document may be provided in the form of methods, systems or computer program products. Therefore, the present document may adopt the form of hardware embodiments, software embodiments or combined software and hardware embodiments. In addition, the present document may adopt the form of computer program products implemented based on one or more of computer usable memory media (including but not limited to magnetic disk memories, optical memories, etc.) containing computer usable program codes therein.

The present document is described by referring to flowcharts and/or block diagrams of the methods, the apparatuses (systems) and the computer program products according to the embodiments of the present document. It should be understood that each process and/or block in the flowcharts and/or block diagrams and combinations of processes and/or blocks in the flowcharts and/or block diagrams may be implemented through computer program instructions. These computer program instructions may be provided to processors of general-purpose computers, special-purpose computers, embedded computers or other programmable data processing devices to produce a machine, such that instructions executed through processors of computers or other programmable data processing devices produce apparatuses for realizing functions designated in one process or more processes of the flowcharts and/or one block or more blocks of the block diagrams.

These computer program instructions may also be stored in computer-readable memories which can guide computers or other programmable data processing devices to work in a specific manner, such that the instructions stored in the computer-readable memories produce products including instruction devices, and the instruction devices realize functions designated in one process or more processes of the flowcharts and/or one block or more blocks of the block diagrams.

These computer program instructions may also be loaded to computers or other programmable data processing devices, such that a series of operation steps are executed on the computers or other programmable devices to perform processing realized by the computers, such that the instructions which are executed on the computers or other programmable devices provide steps for realizing functions designated in one process or more processes of the flowcharts and/or one block or more blocks of the block diagrams.

Based on this, the embodiment of the present document further provides a computer storage medium, including a group of instructions, which, when being executed, cause at least one processor to execute the above mentioned resource obtaining methods.

The embodiments described are just preferred embodiments of the present document and are not used for limiting the protection scope of the present document.

What we claim is:

1. A resource obtaining method, comprising:
   performing monitoring for a time length of T4 on an unlicensed carrier
   upon finding that the unlicensed carrier is idle through monitoring, performing a fallback operation with a contention time window to obtain a right to use the unlicensed carrier; wherein the fallback operation comprises selecting a random fallback value in a designated contention time window and decreasing the fallback value progressively to 0; and
   using the obtained unlicensed carrier resource to transmit data from the start moment of a subframe after the right to use the unlicensed carrier is acquired.

2. The method according to claim 1, wherein the method further comprises:
   sending a channel occupation signal by using the unlicensed carrier within the time interval, wherein the channel occupation signal is at least one of the following:
   time information about occupation of the unlicensed carrier, a Beacon signal for channel occupation, and a reference signal.

3. The method according to claim 2, wherein the method further comprises:
   sending control signaling by using a licensed carrier paired with the unlicensed carrier to schedule UE data to be transmitted in the unlicensed carrier.

4. The method according to claim 1, wherein said performing the fallback operation with the contention time window to obtain the right to use the unlicensed carrier comprises:
   determining a fallback moment in a designated contention time window, and monitoring the unlicensed carrier in the contention time window before the determined fallback moment;
   determining that the unlicensed carrier is idle through monitoring in the contention time window till the determined fallback moment; and
   starting to send the channel occupation signal by using the unlicensed carrier at the determined fallback moment.

5. The method according to claim 4, wherein said determining the fallback moment in a designated contention time window is:
   dividing the contention time window into N parts and sequentially numbering as 0 to N−1; and
   randomly generating a numerical value M between 0 and N−1, wherein a moment corresponding to M is the determined fallback moment.

6. The method according to claim 5, wherein a time length of T4 is one OFDM symbol or half OFDM symbol or is not less than 20 μs.

7. The method according to claim 5, wherein a time length of each part of the N parts does not exceed a value equal to the contention time window divided by 37 ms or 19 ms or 7 ms.

8. The method according to claim 1, wherein a time length of the contention time window does not exceed 1 ms.

9. The method according to claim 1, wherein a time length of the contention time window is 1–T4 ms, wherein T4 is a designated time length, and a value range of T4 is greater than or equal to 0 and is less than the time length of the contention time window.

10. A station, comprising a processor and a memory storing instructions which, when being implemented by the processor, enable the processor to:
perform monitoring for a time length of T4 on an unlicensed carrier;
perform a fallback operation with a contention time window, upon finding that the unlicensed carrier is idle through monitoring, to obtain a right to use the unlicensed carrier; wherein the fallback operation comprises selecting a random fallback value in a designated contention time window and decreasing the fallback value progressively to 0; and
use the unlicensed carrier resource to transmit data from the start moment of a subframe after the right to use the unlicensed carrier is acquired.

11. The station according to claim 10, wherein the processor is further configured to: send a channel occupation signal by using the unlicensed carrier within the time interval, wherein the channel occupation signal is at least one of the following:
time information about occupation of the unlicensed carrier, a Beacon signal for channel occupation, and a reference signal.

12. The station according to claim 10, wherein the processor is further arranged to send control signaling by using a licensed carrier paired with the unlicensed carrier to schedule UE data to be transmitted in the unlicensed carrier.

* * * * *